US010988927B2

(12) United States Patent
Gloftis et al.

(10) Patent No.: US 10,988,927 B2
(45) Date of Patent: Apr. 27, 2021

(54) SUSPENDED CEILING HANGER CLIP

(71) Applicant: LOCKING KEY PTY LTD AS TRUSTEE FOR LOCKING KEY UNIT TRUST, Queensland (AU)

(72) Inventors: Jason Michael Gloftis, Queensland (AU); Grant Peter O'Brien, Queensland (AU)

(73) Assignee: LOCKING KEY PTY LTD AS TRUSTEE FOR LOCKING KEY UNIT TRUST, Queensland (AU)

(*) Notice: Subject to any disclaimer, the term of this patent is extended or adjusted under 35 U.S.C. 154(b) by 0 days.

(21) Appl. No.: 16/617,772

(22) PCT Filed: Jun. 3, 2018

(86) PCT No.: PCT/AU2018/050551
§ 371 (c)(1),
(2) Date: Nov. 27, 2019

(87) PCT Pub. No.: WO2018/218312
PCT Pub. Date: Dec. 6, 2018

(65) Prior Publication Data
US 2020/0190797 A1 Jun. 18, 2020

(30) Foreign Application Priority Data
Jun. 2, 2017 (AU) ................. 2017902100

(51) Int. Cl.
*E04B 9/18* (2006.01)
*E04B 9/20* (2006.01)
(Continued)

(52) U.S. Cl.
CPC .............. *E04B 9/18* (2013.01); *E04B 9/183* (2013.01); *E04B 9/205* (2013.01); *E04B 9/225* (2013.01); *F16M 13/027* (2013.01)

(58) Field of Classification Search
CPC ... E04B 9/18; E04B 9/225; E04B 9/06; E04B 9/183; E04B 9/205
See application file for complete search history.

(56) References Cited

U.S. PATENT DOCUMENTS 3,708,941 A * 1/1973 Cuckson ................. E04B 9/205
52/506.08
9,976,303 B2 * 5/2018 Gloftis ...................... E04B 9/18
(Continued)

FOREIGN PATENT DOCUMENTS

AU 2006201389 A1 10/2006
AU 2010241421 B2 9/2011
(Continued)

OTHER PUBLICATIONS

English Bibliography of Chinese Patent Application No. CN102086674A, published on Jun. 8, 2011, printed from Derwent Innovation on Dec. 7, 2020, 5 pages.
(Continued)

*Primary Examiner* — Andrew J Triggs
(74) *Attorney, Agent, or Firm* — Fay Sharpe LLP

(57) ABSTRACT

The present invention relates to a suspended ceiling hanger clip and a suspended ceiling formed using the hanger clip. The suspended ceiling hanger clip has a longitudinally extending base having a first end and a second end and a pair of generally parallel co-extensive flanges extending downwardly from the base. At least one projection in each flange is formed with a ramp surface. An aperture is formed in the base for receiving an upper end of the elongate suspension rod therein. The suspension rod has a longitudinal axis extending along a length between spaced apart upper and lower ends, with the lower end having an attachment means.
(Continued)

The upper end of the suspension rod extends through and is fixedly retained from removal from the aperture in the base of the hanger clip.

19 Claims, 17 Drawing Sheets

(51) Int. Cl.
*E04B 9/22* (2006.01)
*F16M 13/02* (2006.01)

(56) References Cited

U.S. PATENT DOCUMENTS

| | | | |
|---|---|---|---|
| 2013/0047541 A1* | 2/2013 | Mayer | E04B 9/065 52/506.05 |
| 2015/0240477 A1 | 8/2015 | Weeks et al. | |
| 2017/0044767 A1* | 2/2017 | Gloftis | E04B 9/18 |
| 2020/0190797 A1* | 6/2020 | Gloftis | E04B 9/06 |

FOREIGN PATENT DOCUMENTS

| | | |
|---|---|---|
| CN | 102086674 A | 6/2011 |
| WO | 2015161342 A1 | 10/2015 |

OTHER PUBLICATIONS

Rondo Building Services, Rondo Duo product brochure, Two-Way Exposed Suspended Ceiling Grid System, published Aug. 2008, 20 pages.
International Search Report for PCT Application No. PCT/AU2018/050551, dated Aug. 27, 2018, 6 pages.
Written Opinion of the International Searching Authority for PCT Application No. PCT/AU2018/050551, dated Aug. 27, 2018, 8 pages.
International Preliminary Report on Patentability (Chapter II) for PCT Application No. PCT/AU2018/050551, Completed on May 3, 2019, 4 pages.

* cited by examiner

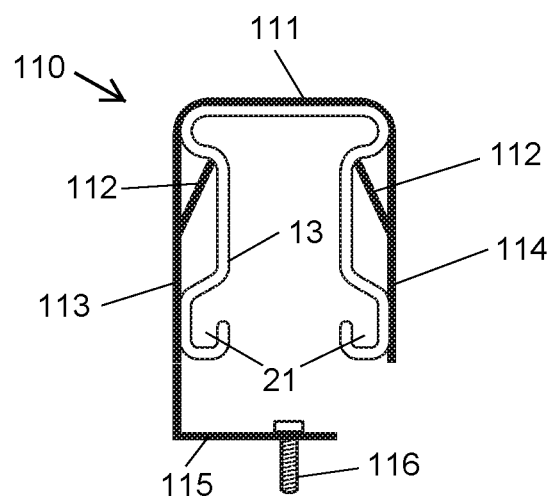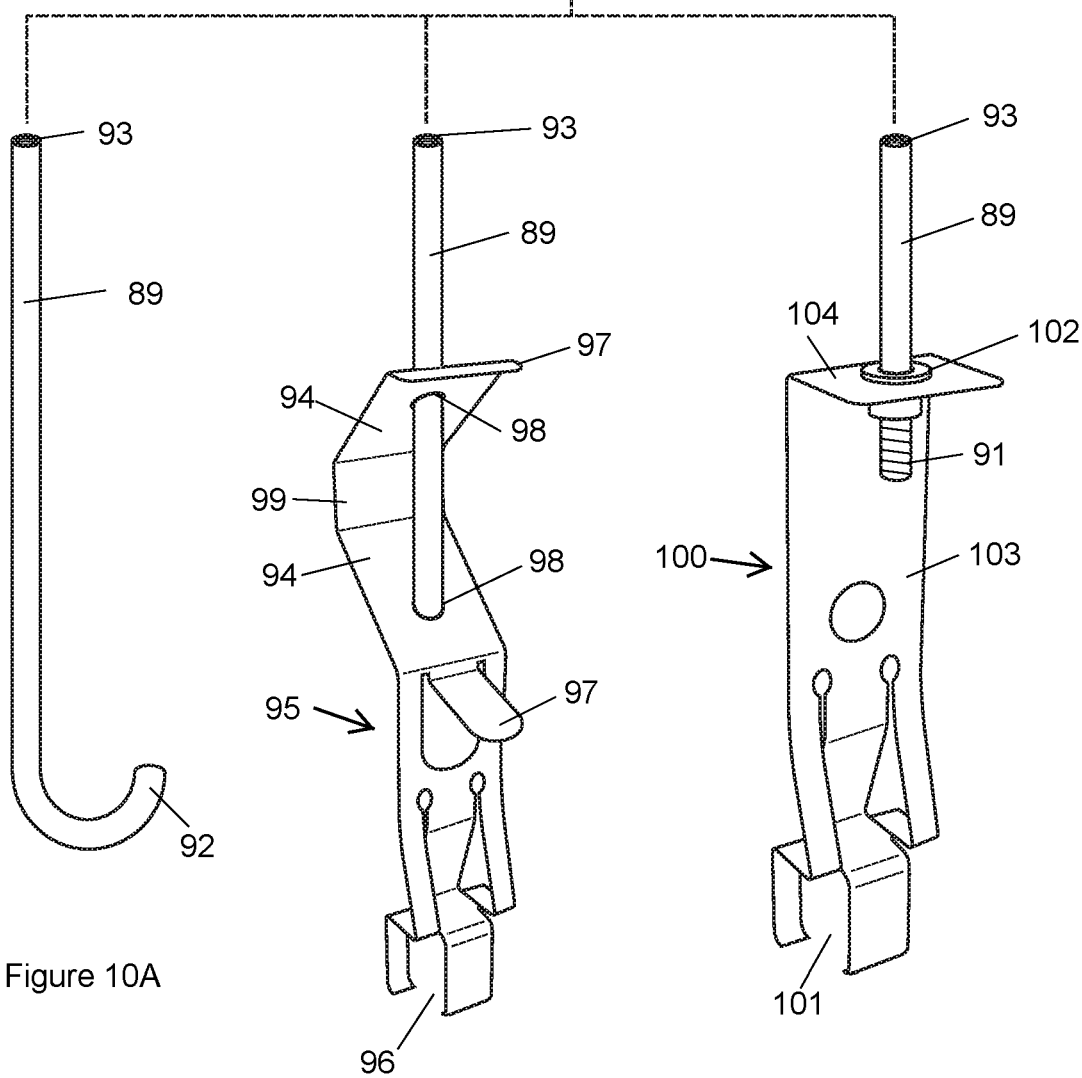
Figure 10A
Figure 10B
Figure 10C

SUSPENDED CEILING HANGER CLIP

During the international stage of the PCT parent application (PCT/AU2018/050551) a Chapter II Demand was filed on Mar. 29, 2019 as indicated on the WIPO Patentscope database. An Article 34 amendment amending the specification and claims was filed along with the Demand. The International Preliminary Report on Patentability Chapter II published on May 7, 2019 included the Article 34 amendment with marked-up and clean versions of the specification and claims. The IPRP II with the Article 34 amendment is also available on the WIPO Patentscope database. Moreover, the documents filed with the USPTO on Nov. 27, 2020 did not cancel the Article 34 amendment (see PAIR IFW, Transmittal of New Application) and included the IPRP II with the Article 34 amendment (see PAIR IFW, Incoming IPEA/409—Int'l Prelim Report on Patentability). Based on the foregoing, the amended specification resulting from the Article 34 amendment is the baseline specification for this US patent application. However, the Applicant notes that the specification in the published version of the US application (US 2020/0190797) is based on the original specification from the PCT application rather than the amended specification from the Article 34 amendment. It also appears that the original specification from the PCT application was examined rather than the amended specification from the Article 34 amendment in conjunction with the Sep. 21, 2020 Office Action.

FIELD OF THE INVENTION

This invention relates generally to a ceiling suspension unit of the kind adapted to support a grid-work of channels suspended from an overhead structure. In particular, the present invention relates to a suspended ceiling hanger clip and method of using the hanger clip to support the grid-work of channels in a combined exposed grid and a key lock concealed grid suspended ceiling system.

BACKGROUND OF THE INVENTION

It should be noted that reference to the prior art herein is not to be taken as an acknowledgement that such prior art constitutes common general knowledge in the art.

Suspended ceilings, which may also be referred to as drop ceilings or false ceilings, are well known and are a type of architectural design element used in commercial and residential buildings. Suspended ceilings typically include a suspended grid of support members hanging from wires or rods attached to the plenum, and panels or planks secured to the grid. The popularity of these ceilings is due, at least in part, to the visual and acoustic benefits coupled with the simplicity and ease of installation of the system.

The most common form of suspended ceilings includes light weight panels, often square or rectangular in shape, that "drop" into a supporting exposed T-grid without additional fastening mechanisms. These types of drop ceilings provide easy access to the plenum space above the ceiling for access to air conditioning equipment, wiring, plumbing, and the like. These systems are typically referred to as an exposed grid suspended ceiling. They consist of long metal strips, called primary sections which form main-tee and cross-tee interconnected sections which together form a grid system, which are then filled with acoustical ceiling tiles. These exposed grid systems feature a standard metal frame around each tile.

Due to an increasing demand for more aesthetically pleasing suspended ceilings another form of suspended ceiling was designed. This system includes a flush mounted building board attached to a grid of channels and rails. These systems typically remove the supporting T-grid and direct-fix plasterboard to a grid-work of channels and overhead structure to provide a more pleasing flush finish. These systems use clips and hangers in order to suspend a grid of furring channel and top cross rails below a supporting structure which can then be sheeted with an appropriate board lining. This allows the designer to bring the ceiling level down to the required height. These systems are typically referred to as a concealed grid suspended ceilings.

Effective building design requires balancing multiple objectives, including aesthetics, acoustics, environmental factors, and integration with the building's infrastructure. This together with the cost of construction as well as long-term operation costs provide the building designer with a myriad of issues. It is now common design practice to use a combination of both exposed and concealed grid suspended ceilings to produce a particular architectural design. For example, both systems can be utilised and interlocked to produce a ceiling which has a perimeter detail formed of a flush mounted builders board concealed grid system which transitions into an exposed grid suspension system. This system provides the aesthetically pleasing perimeter detail of the concealed system with the added benefit of the exposed grid access to the facilities located above and within the suspended ceiling such as electrical wiring, plumbing and air-conditioning.

In the above systems to simplify the transition from one system to another the concealed grid system of top cross rails is utilised seamlessly throughout. In order for the exposed grid system of tees to connect to the top cross rail a clip was designed which passes over the top of the top cross rail and connects to the suspension head of the tees. This ensures that the ceiling level of both suspended ceilings is maintained across the combined architectural designed suspended ceiling system.

Both systems present installation issues and drawbacks when it comes to mounting items in or within the suspended ceiling. The applicants Australian Patent Application No 2015251495 addresses the issues with the direct-fix concealed grid system and is hereby incorporated by reference thereto.

The exposed grid system described above is designed to fit seamlessly within the top cross rail of the concealed grid system. In order to maintain the ceiling level with the direct-fix plasterboard the clip which is designed to pass over the top cross rail will suspend the exposed grid system at the correct level. Therefore, with plasterboard being directly fixed to a furring channel and the exposed grid attached to the top cross rail the distance between both the finished plasterboard surface, the exposed grid surface and the top cross rail is determined by the locking key which retains the furring channel to the top cross rail and the clip which connects over the top cross rail for the exposed grid system. This minimum distance needs to be considered when mounting items in or on the ceiling system. For example, the small clearance between the top cross rail and the exposed grid system can be problematic when mounting recessed lighting or the like components in the ceiling.

Given the number of fixing components in the above systems, it can be somewhat limiting where items like lighting, speakers and air conditioning ducts and vents can be placed. These items are typically flush mounted onto the outside surface of the exposed grid metal frame or the tile and the majority of the size of these items is located within the ceiling cavity formed between the tile or metal frame and the top cross rail forming the suspended ceiling frame. Therefore there needs to be sufficient clearance within the cavity for these items.

A number of difficulties also exist in that they are time-consuming to install and accuracy of spacing may be poorly maintained over large expanses of ceiling. Support system designs that provide ready access into the plenum above usually do so at the expense of a cluttered appearance with too much of the support system being visible from below. Another problem is that supports that pass alongside recessed fluorescent lighting fixtures often intrude into the area that should be kept clear in order to realise minimum interference with the flow of room supply air furnished by air supply boots attached to the fixtures.

Clearly it would be advantageous if a hanger clip for an exposed suspended ceiling could be devised that helped to at least ameliorate some of the shortcomings described above. In particular, it would be beneficial if a hanger clip which has the ability to provide a clearance between the top cross channel and the exposed grid metal frame was devised or to at least provide a useful alternative.

SUMMARY OF THE INVENTION

The present invention has been developed to provide a suspended ceiling clip which can be used to support a grid-work of channels in a combined exposed grid and a key lock concealed grid suspended ceiling system.

In accordance with a first aspect, the present invention provides a suspended ceiling hanger clip comprising: a longitudinally extending base having a first end and a second end; a pair of generally parallel co-extensive flanges extending downwardly from the base and between which the base is located; at least one projection in each flange, each projection forming a ramp surface extending transversely outwardly from each respective flange; an aperture formed in the base and positioned equidistant from the first and second ends of the base; an elongate suspension rod having a longitudinal axis extending along a length between spaced apart ends, an upper end passing through the aperture in the base of the hanger clip, and a lower end having an attachment means; and wherein the upper end of the suspension rod extends through and is fixedly retained from removal from the aperture in the base of the hanger clip.

Preferably, the length of the suspension rod may be in the range of 50 to 500 mm. The length of the suspension rod may be varied to achieve a pre-determined distance from the base of the hanger clip to the lower end of the suspension rod in the range of 50 to 500 mm.

Preferably, the at least one projection in each flange may be pressed outwardly from the flange at a location adjacent the base of the hanger clip. Alternatively, two or three projections may be pressed outwardly in each flange at a location at or near the base of the clip.

Preferably, the pair of generally parallel co-extensive flanges may be resiliently deformable.

Preferably, the upper end of the suspension rod may be bent through an angle with respect to the longitudinal axis of the suspension rod such that the upper end is fixedly retained from removal from the aperture in the base of the hanger clip. The angle which the upper end of the suspension rod is bent may be in the range of 150 to 180 degrees with respect to the longitudinal axis of the suspension rod.

Preferably, the hanger clip may further comprise a rod engagement device extending through the aperture in the base of the hanger clip for fixing the upper end of the suspension rod to the base of the hanger clip. The rod engagement device may be a threaded fastener which is designed to engage with a corresponding threaded socket located in the upper end of the suspension rod.

Preferably, the attachment means at the lower end of the suspension rod may comprises any one of: i) a hook bent at an angle of approximately 30 degrees with respect to a longitudinal axis of the suspension rod; or ii) a threaded socket located within the lower end of the suspension rod; or iii) a screw thread located on an outer surface of the lower end of the suspension rod; or iv) a longitudinally extending straight section of the suspension rod located at or adjacent the lower end of the suspension rod.

Preferably, the screw thread located on the outer surface of the lower end of the suspension rod may be engaged by a threaded socket within a thread adjustable suspension clip.

Preferably, the longitudinally extending straight section of the suspension rod located at or adjacent the lower end of the suspension rod may be engaged by an apertured bowed leaf spring of a spring adjustable suspension clip.

Preferably, the pair of co-extensive flanges extending downwardly from the base may terminate at a lower end portion with a horizontal flange extending outwardly therefrom. A surface of the horizontal flange may be spaced a distance from the at least one projection in each flange to allow the suspended ceiling clip to be received and secured within a longitudinal channel. The surface of the horizontal flange may be adapted to make contact with an lower surface of the longitudinal channel.

Preferably, the hanger clip may be manufactured from a resiliently deformable material. The resiliently deformable material may be any one of a sheet metal made from aluminium or steel or a high density plastics material.

In accordance with a second aspect, the present invention provides a suspended ceiling hanger clip comprising: a longitudinally extending base having a first end and a second end; a pair of generally parallel co-extensive flanges extending downwardly from the base, the base and flanges forming an longitudinally elongated U-shaped configuration; a rod mounting extension extending centrally from one of said pair of flanges; an aperture formed in the rod mounting extension; at least one projection in each flange, each projection forming a ramp surface extending transversely inwardly from each respective flange; an elongate suspension rod having a longitudinal axis extending along a length between spaced apart ends, an upper end engaging the rod mounting extension of the hanger clip, and a lower end having an attachment means; and wherein the upper end of the suspension rod extends through and is fixedly retained from removal from the aperture in the rod mounting extension of the hanger clip.

Preferably, the length of the suspension rod may be in the range of 50 to 500 mm. The length of the suspension rod may be varied to achieve a pre-determined distance from the rod mounting extension of the hanger clip to the lower end of the suspension rod in the range of 50 to 500 mm.

Preferably, the at least one projection in each flange may be pressed inwardly from the flange at a location adjacent the base of the hanger clip. Alternatively, two or three projections may be pressed inwardly in each flange at a location at or near the base of the clip.

Preferably, the pair of generally parallel co-extensive flanges may be resiliently deformable.

Preferably, the aperture in the rod mounting extension may be adapted for receiving a fastener for fixing the upper end of the suspension rod to the rod mounting extension of the hanger clip. The fastener may be a threaded fastener which is designed to attach to a corresponding threaded socket located in the upper end of the suspension rod.

Preferably, the attachment means at the lower end of the suspension rod may comprises any one of: i) a hook bent at an angle of approximately 30 degrees with respect to a longitudinal axis of the suspension rod; or ii) a threaded socket located within the lower end of the suspension rod; or iii) a screw thread located on an outer surface of the lower end of the suspension rod; or iv) a longitudinally extending straight section of the suspension rod located at or adjacent the lower end of the suspension rod.

Preferably, the screw thread located on the outer surface of the lower end of the suspension rod may be engaged by a threaded socket within a thread adjustable suspension clip.

Preferably, the longitudinally extending straight section of the suspension rod located at or adjacent the lower end of the suspension rod may be engaged by an apertured bowed leaf spring of a spring adjustable suspension clip.

Preferably, the hanger clips may be manufactured from a resiliently deformable material. The resiliently deformable material may be any one of a sheet metal made from aluminium or steel or a high density plastics material.

In accordance with a still further aspect, the present invention provides a suspended ceiling comprising: a plurality of top cross rails, each top cross rail having a base extending longitudinally with a pair of generally parallel co-extensive flanges extending downwardly from the base and forming a longitudinal slot bordered by in-turned opposing longitudinal jaws on each flange; a plurality of adjustable length hanger assemblies anchored to a structural part of a building and connected with each top cross rail suspending same at a selected height in a common plane with other ones of said top cross rails; a plurality of parallel mounted support runners interconnected to form a grid, each support runner having an upper flange, a lower flange for holding a ceiling panel, and a vertical web interconnecting said flanges and provided with at least one opening, the parallel mounted support runners extending beneath and crossing the top cross rails; and a plurality of suspended ceiling hanger clips, each suspended ceiling hanger clip comprising: a longitudinally extending base having a first end and a second end; a pair of generally parallel co-extensive flanges extending downwardly from the base and between which the base is located; at least one projection in each flange, each projection forming a ramp surface extending transversely outwardly from each respective flange and each projection adapted to engage with a surface of the in-turned opposing longitudinal jaws on the top cross rail to engage the hanger clip within the longitudinal slot of the top cross rail; an aperture formed in the base and positioned equidistant from the first and second ends of the base; an elongate suspension rod having a longitudinal axis extending along a length between spaced apart ends, an upper end passing through the aperture in the base of the hanger clip, and a lower end having an attachment means for releasably engaging either the at least one opening in the support runner or the upper flange in the support runner; and wherein the upper end of the suspension rod extends through and is fixedly retained from removal from the aperture in the base of the hanger clip; wherein the length which the suspension rod extends from the base of the hanger clip spaces apart the top cross rail and the support runner when the hanger clip is secured within the longitudinal slot of the top cross rail and connected to the support runner, thereby providing a first void therebetween, wherein the first void formed between the top cross rail and the support runner is sized to allow clearance for mounting of components in a second void formed between i) a backside of the ceiling panel held within the support runner and ii) a bottom of the top cross rail.

Preferably, the suspended ceiling hanger clip may further comprises any one of the features of the first aspect.

Preferably, by resiliently deforming the flanges of the hanger clip may allow the projections and ramp sections to snap fit within the in-turned opposing longitudinal jaws extending from the top cross rail and to inhibit the removal of the hanger clip from the top cross rail. The hanger clip may be designed to be free to slide within the top cross rail when the flanges are resiliently deformed, therefore making the hanger clip adjustable within the top cross rail.

Preferably, the length of the suspension rod may be in the range of 50 to 500 mm. The length of the suspension rod may vary a distance which spaces apart the top cross rail and the support runner, thereby varying a size of the first void and second voids.

Preferably, the hanger assemblies may further comprise a pair of jaws for accommodating and securing a top section of the top cross rail and an adjustable anchorage for suspending at a selected level the top cross rail from the structural part of the building located above the suspended ceiling. The adjustable anchorage may comprise a pair of extendible rods frictionally joined together at adjacent ends by an apertured bowed leaf spring.

In accordance with a still further aspect, the present invention provides a ceiling construction for suspension within a room of a building or an external ceiling, comprising when assembled: a plurality of parallel spaced top cross rails; a plurality of adjustable length hanger assemblies anchored to structural parts of the building and connected with each top cross rail suspending same at a selected height in a common plane with other ones of said top cross rails; a combination of a plurality of parallel mounted support runners interconnected to form a grid for holding a ceiling panel and a plurality of parallel mounted furring channels to which a flush mounted builders ceiling board is fixed, the parallel mounted support runners and the parallel mounted furring channels extending beneath and crossing the top cross rails; a plurality of hanger clips for joining the top cross rails to the parallel mounted support runners, each suspended ceiling hanger clip comprising: a longitudinally extending base having a first end and a second end; a pair of generally parallel co-extensive flanges extending downwardly from the base and between which the base is located; at least one projection in each flange, each projection forming a ramp surface extending transversely outwardly from each respective flange and each projection adapted to engage with a surface of an in-turned opposing longitudinal jaws on the top cross rail to engage the hanger clip within a longitudinal slot of the top cross rail; an aperture formed in the base and positioned equidistant from the first and second ends of the base; an elongate suspension rod having a longitudinal axis extending along a length between spaced apart ends, an upper end passing through the aperture in the base of the hanger clip, and a lower end having an attachment means for releasably engaging either at least one opening in the support runner or an upper flange in the support runner; and wherein the upper end of the suspension rod extends through and is fixedly retained from removal from the aperture in the base of the hanger clip; a plurality of key clips for joining the top cross rails to the parallel mounted furring channels, the clip comprising: a longitudinally extending base; a pair of flanges extending downwardly a length from the base and between which the base is located; a pair of hooks on each flange, each pair of hooks adapted to releasably connect to the furring channel; at least one projection in each flange, each projection engaging with a surface on the top cross rail to secure the key clip within the longitudinal slot of the top cross rail; and wherein the lengths of the suspension rods of the suspended ceiling hanger clips and the pair of flanges of the key clips space apart the top cross rails from the respective support runners and furring channels when the hanger clips and the key clips are secured within the longitudinal slot of the top cross rails and connected to the support runner and the furring channel respectively, thereby providing a first void therebetween, wherein the first void formed between the top cross rails and the support runners and the furring channels is sized to allow clearance for mounting of components in a second void formed between i) a backside of the ceiling panel held within the support runner and a backside of the flush mounted builders ceiling board fixed to the furring channels and ii) a bottom of the top cross rail.

In accordance with a still further aspect, the present invention provides a method of constructing a suspended ceiling using the suspended ceiling hanger clip of the first aspect, the method comprising the steps of: fixing at least one hangar from a structural part of a building; attaching at least one top cross rail to the at least one hanger; inserting at least one hanger clip inside a longitudinal slot in the top cross rail; positioning at least one support runner below the top cross rails and attached to the lower end of the suspension rod of the hanger clips; and wherein the joining of the top cross rails to the support runners by the hanger clips are such that the support runners are suspended below the top cross rails by the length which the suspension rod extends from the base of the hanger clip when the hanger clip is secured within the longitudinal slot of the top cross rail and connected to the support runner, thereby providing a first void therebetween, wherein the first void formed between the top cross rail and the support runner is sized to allow clearance for mounting of components in a second void formed between i) a backside of the ceiling panel held within the support runner and ii) a bottom of the top cross rail.

In accordance with a still further aspect, the present invention provides a method of constructing a suspended ceiling using the hanger clip of the second aspect, the method comprising the steps of: fixing at least one hangar from a structural part of a building; attaching at least one top cross rail to the at least one hanger; attaching at least one hanger clip over the top cross rail; positioning at least one support runner below the top cross rails and attached to the lower end of the suspension rod of the hanger clips; and wherein the joining of the top cross rails to the support runners by the hanger clips are such that the support runners are suspended below the top cross rails by the length which the suspension rod extends from the rod mounting extension of the hanger clip when the hanger clip is secured over the top cross rail and connected to the support runner, thereby providing a first void therebetween, wherein the first void formed between the top cross rail and the support runner is sized to allow clearance for mounting of components in a second void formed between i) a backside of the ceiling panel held within the support runner and ii) a bottom of the top cross rail.

Any one or more of the above embodiments or preferred features can be combined with any one or more of the above aspects.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

FIGS. 10a to 10c show a hanger clip which is connected over the top of the top cross channel with three variations for connecting to the exposed grid tee in accordance with a further embodiment of the present invention;

DETAILED DESCRIPTION OF THE PREFERRED EMBODIMENTS

Figure 1:
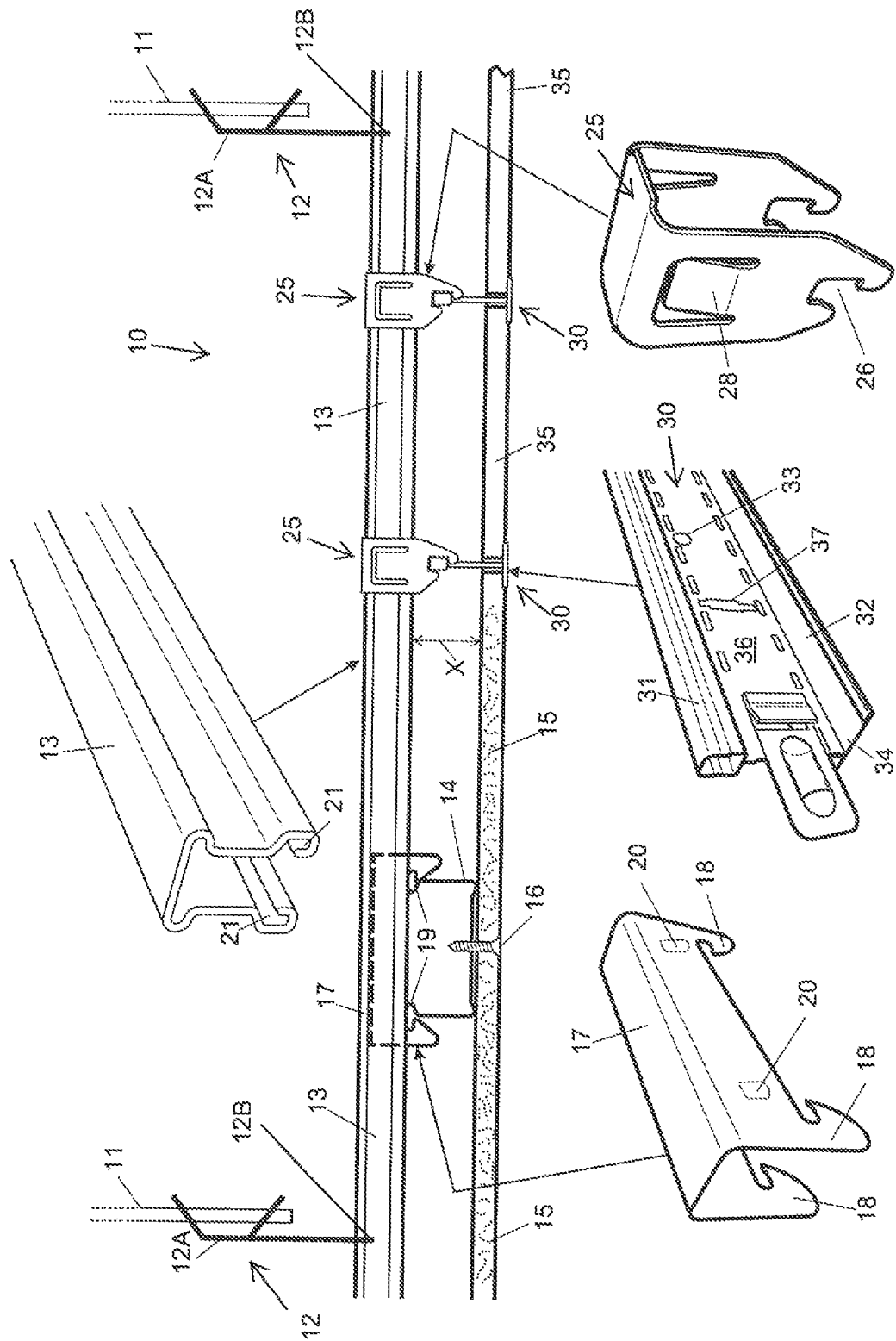
FIG. 1 shows a fragmentary perspective view of part of a combined exposed grid and concealed suspended ceiling constructed and illustrating some of the components in further detail.

The following description, given by way of example only, is described in order to provide a more precise understanding of the subject matter of a preferred embodiment or embodiments.

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Reference will now be made to the drawings in which the various elements of embodiments will be given numerical designations and in which embodiments will be discussed so as to enable one skilled in the art to make and use the invention. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand. Specific reference to components, process steps, and other elements are not intended to be limiting. Further, it is understood that like parts bear the same reference numerals, when referring to alternate figures and different embodiments.

FIG. 1 illustrates a typical prior art combined exposed grid and concealed suspended ceiling 10 showing flush mounted builders ceiling board such as plasterboard 15 and ceiling tiles 35 secured in place. In FIG. 1 the complete structure 10 is suspended from fixing points (not shown) on a roof or upon floor beams of a room of higher level by means of suspension hangers 12. The suspension hangers 12 include a "U" shaped spring clip or apertured bow leaf spring 12A with diverging free arms. The spring clip 12A is riveted at its base to a vertical plate forming the body of the hanger 12. Holes are provided near the ends of the arms and a ceiling suspension rod 11 is passed through said holes so that the hanger 12 is locked upon said rod 11 by the impinging action of the spring arms on said rod 11. In use, if the arms are displaced towards one another the rod 11 will be released so that the hanger 12 can be slid up or down said rod 11.

The lower end of the hangar body plate is slotted to form inwardly directed hooks to attach the hangar 12 to the top cross rail 13. The top cross rail or bar 13 of any desired form providing it has a longitudinal base of suitable enlarged dimension, which is held by the hanger 12 between its confronting end hooks. In a complete ceiling suspension system 10 several or many parallel top cross rails or bars 13 will be suspended by spaced hanger assemblies 12 to form the foundation from which the ceiling panels 35 and plasterboard panels will be supported.

It is the usual practice to provide the top cross rails 13 with a longitudinal slot bordered by in-turned longitudinal jaws 21. A suitable form of furring channel 14 for the supporting of the plasterboard panels 15 is supported at right angles to the top cross rails 13 by individual clip devices 17. The plasterboard is attached to the furring channel 14 by suitable fasteners 16. Each clip device 17 is formed as a plate of sheet metal folded approximately U-shaped with a flat base and approximately parallel arms. At an intermediate position the two arms may have outwardly directed tabs 20. The outer edge of each arm carries two longitudinally extending hook elements 18 which are located at either end of the arm at spaced positions on the clip device 17 and have their hooks 18 confronting each other. The hook elements 18 connect with the out-turned opposing longitudinal jaws 19 extending from the furring channels 14.

During assembly the clip device 17 is forced upwardly into the slot of the top cross rail 13 with its base portion leading, so that the clip 17 will be held by the tabs 20 in its arms between the longitudinal jaws 21 of the top cross rail 13.

The other portion of the combined suspended ceiling 10 is formed with the common top cross rail 13 and a suitable support rail or tee 30 for supporting the ceiling panels 35 supported at right angles to the top cross rail 13 by individual hangar clips 25. The hanger clips 25 are passed over the top of the top cross rail 13 and snap fitted to the top cross rail 13. The Hanger clips 25 are retained upon the top cross rail 13 by inwardly protruding tabs 28.

The support rail or tee 30 is symmetrical about a central plane and includes a central web 36 providing a bulb 31 at the upper extremity of the web 36 and opposed, laterally extending flanges 32 at the lower extremity of the web 36. Typically, the tee 30 is formed of a strip of material with the upper flange or bulb 31 formed in a closed box shape to provide the bulb 31. The upper flange or bulb 31 is shaped to be received within the jaws 26 of the hanger clip 25. The lower laterally extending flanges 32 support the ceiling panels 35 and have an outer exposed face 34. The support rails 30 form an inverted T-shaped grid member for supporting the ceiling panels 35. The central vertical web 36 has a number of openings 33 and cross tee slots 37. The cross tee slots 37 are for receiving ends of cross tees 30 to form a grid system for an exposed suspended ceiling. The openings 33 are for receiving the hook end of a suspension clip (not shown).

From this combined assembly 10 a very rigid connection between the respective components results and the distance X (FIG. 1) represents the distance that the backside of the plasterboard and ceiling panel 15, 35 are located from the bottom of the top cross rail 13. The distance X is fixed by the relationship of the connection between the furring channel 14 and the clip 17 and the hanger clip 25 and the cross tees 30. In use the top sides of the furring channel 14 and the out-turned opposing longitudinal jaws 19 are positioned to sit flush up against the bottom side of the top cross rail 13. Likewise the distance the jaws 26 extend down the sides of the hanger clip 25 to connect with the upper flange or bulb 31 and the length of the web 36 of the cross tees determines the distance X. Both of these relationships are fixed and therefore provide a fixed distance which the respective plasterboard panels 15 and ceiling panels 35 are located below the top cross rail 13. As described above the position of the whole assembly 10 can be varied in relation to the support structure mounted above by the suspension hangers 12 and their position on the suspension rods 11. However the void formed between the backs of the respective plasterboard panels 15 and ceiling panels 35 cannot be adjusted it is fixed by the above mentioned relationships.

The invention will be described with reference to a suspended ceiling hanger clip 40, 60, 80, 110, 200 and method of using the hanger clip to support the grid-work of channels in a combined exposed grid and a key lock concealed grid suspended ceiling systems.

In its broadest form the suspended ceiling hanger clip 40 has a longitudinally extending base 41 having a first end 44 and a second end 45. A pair of generally parallel co-extensive flanges 51, 52 extend from the base 41 and which also locates the base 41 therebetween. A projection 42 is located on each flange 51, 52, with each projection 42 forming a ramp surface extending transversely outwardly from each respective flange 51, 52. An aperture 50 is formed centrally in the base 41, such that the aperture 50 is positioned equidistant from the first and second ends 44, 45 of the base 41. The aperture 50 is adapted to receive the upper end 48 of the elongated suspension rod 47.

The elongate suspension rod 47 has a longitudinal axis extending along a length between spaced apart ends 48, 49.

Figure 2:
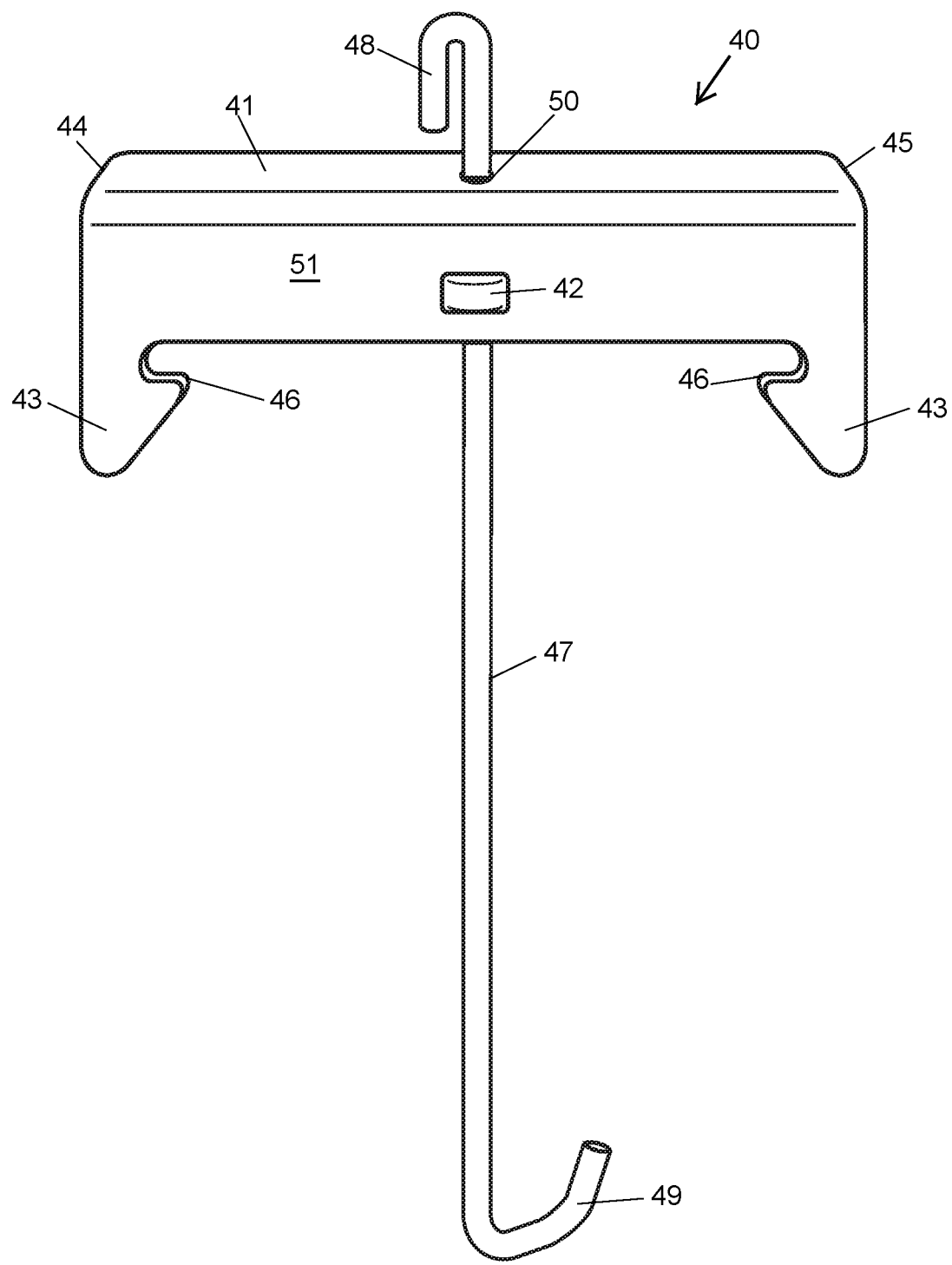
FIG. 2 shows a perspective view of a hanger clip used for securing the exposed grid tees to the top cross channel in accordance with a first embodiment of the present invention.

An upper end 48 passes through the aperture 50 in the base 41 of the hanger clip 40, and a lower end 49 has an attachment means. In FIG. 2 this is a hook locate at the lower end 49. The upper end 48 of the suspension rod 47 extends through and is fixedly retained from removal from the aperture 50 in the base 41 of the hanger clip 40.

Figure 3:
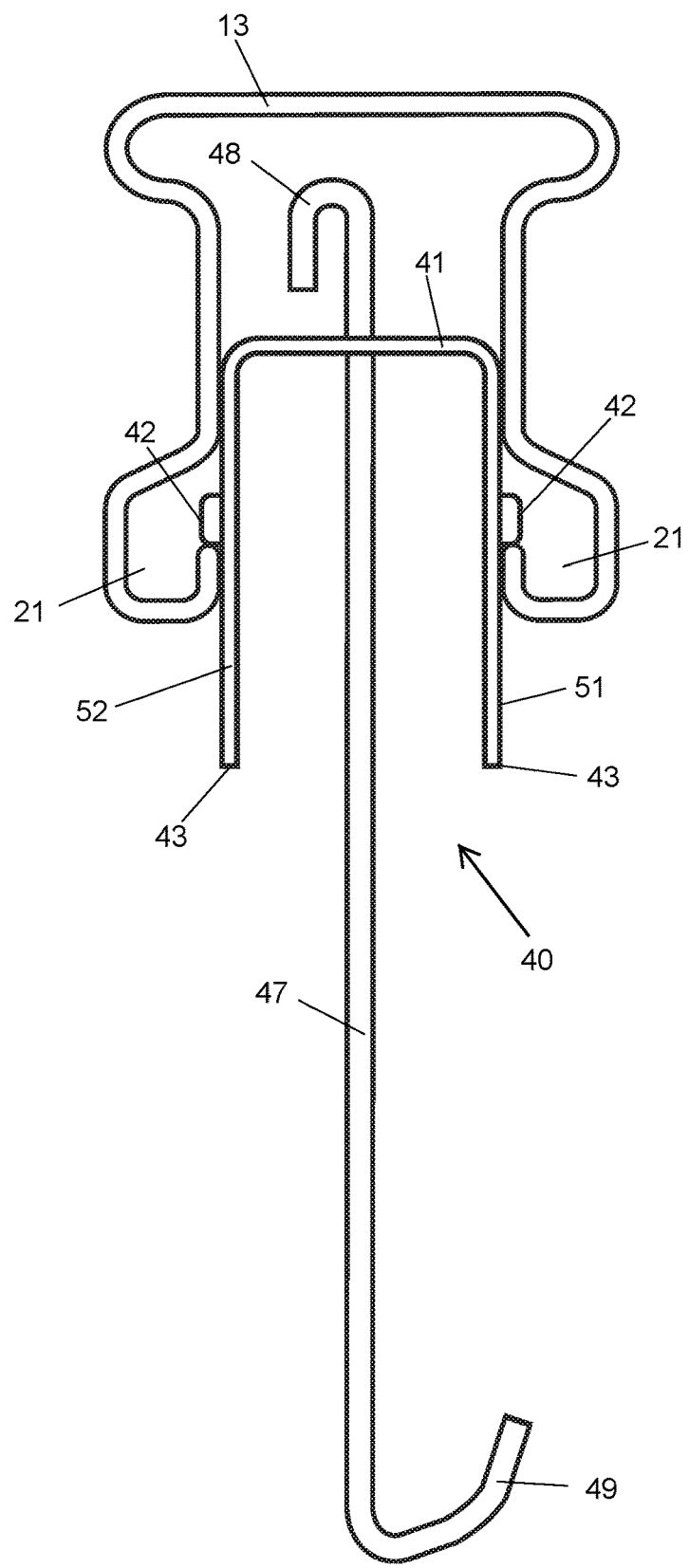
FIG. 3 illustrates the hanger clip of FIG. 2 installed within a top cross rail.
Figure 4:
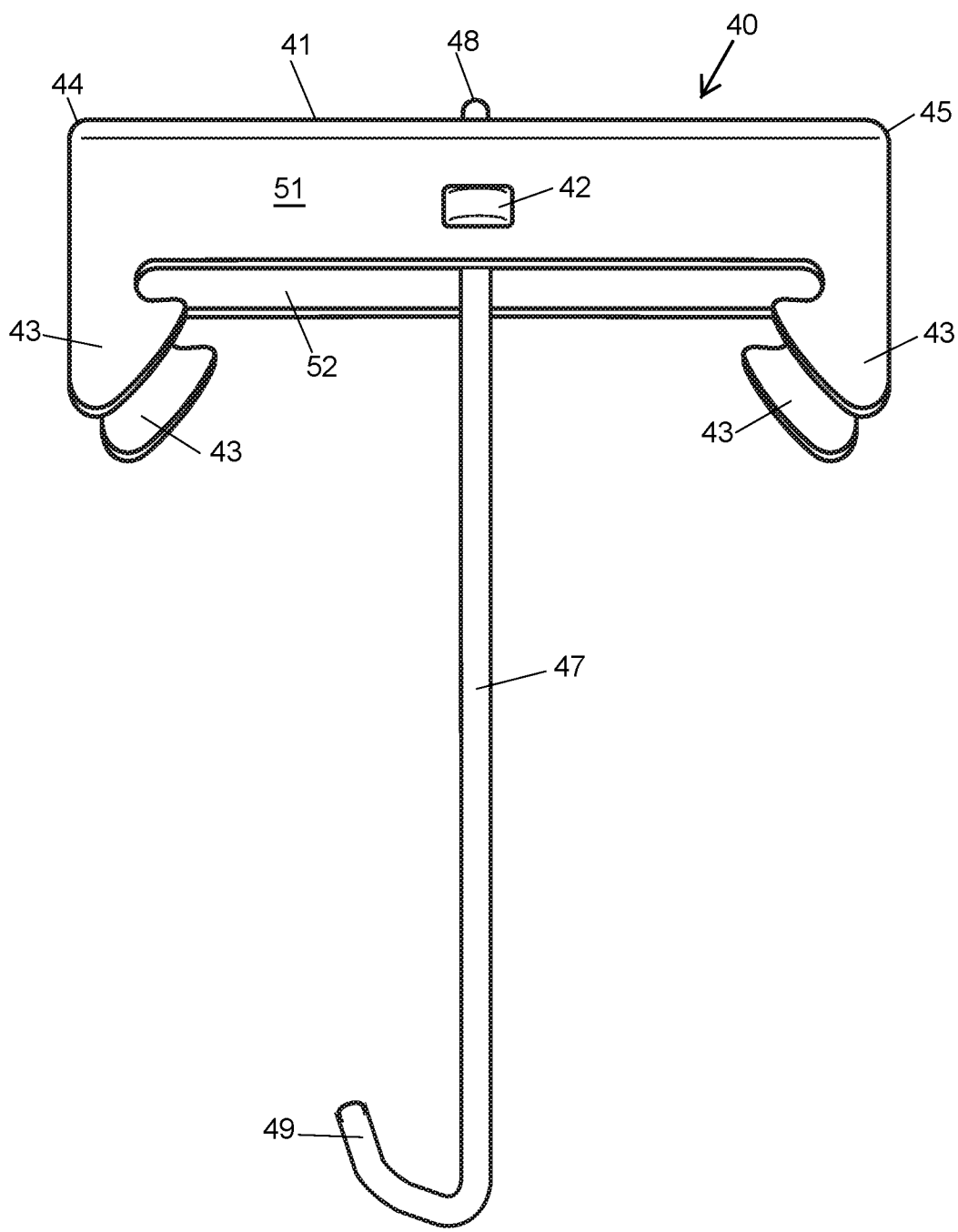
FIG. 4 shows another perspective view of the hanger clip of FIG. 2.

FIGS. 2 to 4 illustrate a first embodiment of the present invention in which a hanger clip 40 is designed for mounting within a top cross rail 13 and to a support runner or tee 30. The support runner or tee 30 has an upper flange in the shape of a bulb 31, a lower flange 32 for holding a ceiling panel 35. The lower flange 32 extends laterally either side of the central vertical web 36 and the flange 32 has an outer surface 34 which forms the exposed side of the metal frame grid. The vertical web 36 interconnecting the flanges 31, 32 is provided with at least one opening 33 and at least one cross tee slot 37.

The hanger clip 40 is designed to snap engage within the longitudinal slot of the top cross rail 13. Typically the top cross rail 13 is attached to the under surfaces of a concrete slab or timber structure directly or suspended by rods 11 or similar hanger members 12 from the concrete slab or floor structure above. As illustrated in FIG. 3 the top cross rail 13 has a longitudinal top and a pair of generally parallel and co-extensive flanges. The flanges project generally downwardly from the top and provide a longitudinally extending cavity into which the hanger clip 40 will project. Each of the flanges terminates along its lower edge with an upwardly extending in-turned longitudinal portion or jaws 21. The terminal portions of the longitudinal jaws 21 are adapted to engage with the tabs 42 of the hanger clip 40.

The hanger clip 40 is of a channel configuration so as to have a longitudinal base 41 extending from a first end 44 to a second end 45 and a pair of longitudinally extending flanges 51, 52. As shown in FIG. 3 the hangar clip 40 is formed in an approximate U-shape and is manufactured from a resiliently deformable material. For example, the resiliently deformable material could be a sheet metal made from aluminium or steel or a high density plastics material. The base 41 is located between the flanges 51, 52 with the flanges 51, 52 extending downwardly from the base 41. The base 41 also has a centrally located aperture 50. The aperture 50 is centrally located in order to balance the suspended weight of the grid structure of the support runners 30 which are suspended below.

Each flange 51, 52 is provided with one or more projections 42 or outwardly directed tabs 42. In this embodiment a single projection 42 is pressed from each flange 51, 52 to form a tab or ramp surface 42. Alternatively two or more projections 42 may be pressed from each flange 51, 52. The tabs 42 are located on the outside of the flanges 51, 52 adjacent to the base 41 of the hanger clip 40. As illustrated in FIGS. 2 to 4 the tabs 42 are located approximately in the middle of each side flange 51, 52 and in use the bottom side of each projection 42 is seated against the terminal ends of the longitudinal jaws 21 of the top cross rail 13.

The outer lower edge of each flange 51, 52 carry two longitudinally extending hook elements 43. Each hook element 43 is located at opposing ends of each flange 51, 52 at spaced apart positions on the hanger clip 40, with each hook 43 being inwardly orientated towards each other. The hook elements 43 would normally connect with the out-turned opposing longitudinal jaws 19 extending from the furring channels 14. The bottom section of each flange 51, 52 including the hooks 43 which project to an end point 46.

The suspension rod 47 has two ends 48, 49, the upper end 48 is designed to engage with the aperture 50 in the base 41 and the lower end 49 is from which the support rail or tee 30 is suspended. In FIGS. 2 to 4 the aperture 50 in the base 41 is sized to receive the suspension rod 47 and allow the upper end 48 to pass through the aperture 50. The upper end 48 is then bent back through an angle of approximately 180 degrees with reference to the longitudinal axis of the suspension rod 47 such that the end of the suspension rod 47 is folded back upon itself. Preferably, the angle through which the upper end 48 is bent is within the range of 150 to 180 degrees. This prevents the upper end 48 from being removed from the aperture 50 in the hanger clip 40. As shown in FIG. 3 when the hanger clip 40 is snapped into the top cross rail 13 the upper end 48 of the suspension rod 47 sits within the cavity formed between the top section of the top cross rail 13 and the top of the suspended ceiling clip 40.

The lower end 49 in FIGS. 2 to 4 is shown as a hook. The hook 49 is designed to releasably engage the openings 33 in the central web 36 of the support runner or tee 30. This allows the support rail 30 to be suspended from the top cross rail 13. The suspension rods 47 are manufactured from steel rod or a high density plastics material. The hooks 49 are typically bent through an angle in the range of approximately 10 to 180 degrees with respect to the longitudinal axis of the suspension rod 47. Preferably, the hook 49 are bent in a two stage process to obtain a first bend extending directly from the longitudinal axis of the suspension rod at an angle in the range of approximately 10 to 40 degrees to axis of the suspension rod 47. A second bend extending from the first bend produces the hook end 49 at an angle in the range of approximately 10 to 180 degrees. The second bend of the hook 49 forming the bent end allows for easier access of the hook 49 to the opening 33 in the support runner 30.

Alternatively, the lower end 49 of the suspension rod 47 has an attachment means for attaching the lower end of the rod 47 to the support runner 30. The attachment means may be as described above a hook 49 bent at an angle of approximately 30 degrees with respect to a longitudinal axis of the suspension rod. In a further embodiment the lower end 49 may have a threaded socket located within the lower end 49 of the suspension rod 47. The threaded socket could be used as an attachment to a complementary threaded shaft attached to a thread adjustable suspension clip or a spring adjustable suspension clip. Likewise, the lower end 49 of the suspension rod 47 may have an external thread for engaging with a complementary threaded socket of a thread adjustable suspension clip. In a still further embodiment, the lower end 49 attachment means could simply be a straight section of the suspension rod 47 which could be adapted to engage an apertured bowed leaf spring of a spring adjustable suspension clip.

The suspension rod 47 extends a length or pre-determined distance from the base 41. The longitudinal section of the rod 47 spaces apart the upper and lower ends 48, 49 of the suspension rod 47. The length of the suspension rods are in the range of 50 to 500 mm in length. With the exception of the distance which the suspended hanger clip 40 extends into the top cross rail 13 the length of the suspension rod 47 is designed to space apart the top cross rail 13 and the support runner or tee 30 to provide a void therebetween. A first void is formed between the top cross rail 13 and the support runner 30 when the hanger clip 40 is secured within the longitudinal slot of the top cross rail 13 and connected to the support runner 30. The first void formed between the top cross rail 13 and the support runner 30 is sized to allow clearance for mounting of components in a second void formed between the backside of the ceiling panel 35 held within the support runner 30 and the bottom of the top cross rail 13. The components are typically mounted through or retained within the ceiling panel 35. The void formed between the top cross rail 13 and the support runner or tee 30 allow the flush mounting or mounting of components within the ceiling panel 35 and the void. The ceiling panel 35 can also be removed to allow for the mounting of components within the frame of the exposed suspended ceiling.

The length of the suspension rod 47 is measured from the base 41 to the bottom of the hook 49 and is sized so as to provide the clearance between the top cross rail 13 and the bottom flange 32 of the support runner or tee 30 to which ceiling tiles 35 are supported. This provides a void in between the back side of the ceiling panel 35 and the bottom of the top cross rail 13. The void allows the flush mounting of such items as speakers, lights and air conditioning components into and through the ceiling panel 35. This will be further described in FIG. 11 below. However it should also be understood that the use of the hanger clip 40 is not limited to only the flush mounting of components in ceilings and other uses within the field of suspended ceilings are included within the present scope of the invention. Typically the suspension rods 47 range in lengths from 50 to 500 mm which provides the present invention with a void of approximately the same dimension.

In use the hanger clip 40 is inserted in an upward direction so that the ramp surfaces 42 of the hanger clip 40 engage with and push past the longitudinally extending jaws 21 of the top cross rail 13. Due to resilient nature of the flanges 51, 52 and the sides of the top cross rail 13 the hanger clip 40 is pushed upward to locate within the longitudinal slot within the top cross rail 13. When the projections 42 of the hanger clip 40 move past the longitudinally extending jaws 21, the hanger clip 40 snap engages into the slot within the top cross rail 13 between the jaws 21. The jaws 21 engage with the bottom of the projections 42 and substantially retain the projections 42 within the jaws 21 as best seen in FIG. 3. The projections 42 inhibit removal of the hanger clip 40 from within the top cross rail 13 due to not being able to move in the direction opposite to the initial upward direction. The hanger clips 40 can be removed from the top cross rail 13 by pushing the hanger clip 40 in an upward direction and the resiliently deforming the flanges 51, 52 inwardly to allow the hanger clip to be removed from the top cross rail 13. Likewise the hooks 49 engage with the opening 33 in the support runners 30 to secure the support runners 30 in place. This then allows the ceiling panels 35 to be inserted within the frame formed at the bottom section of the support runner 30.

The resilient nature of the flanges 51, 52 of the hanger clip 40 allow the hanger clip 40 to be free to slide along within the top cross rail 13, therefore making the hanger clip 40 adjustable within the top cross rail 13.

Figure 5:
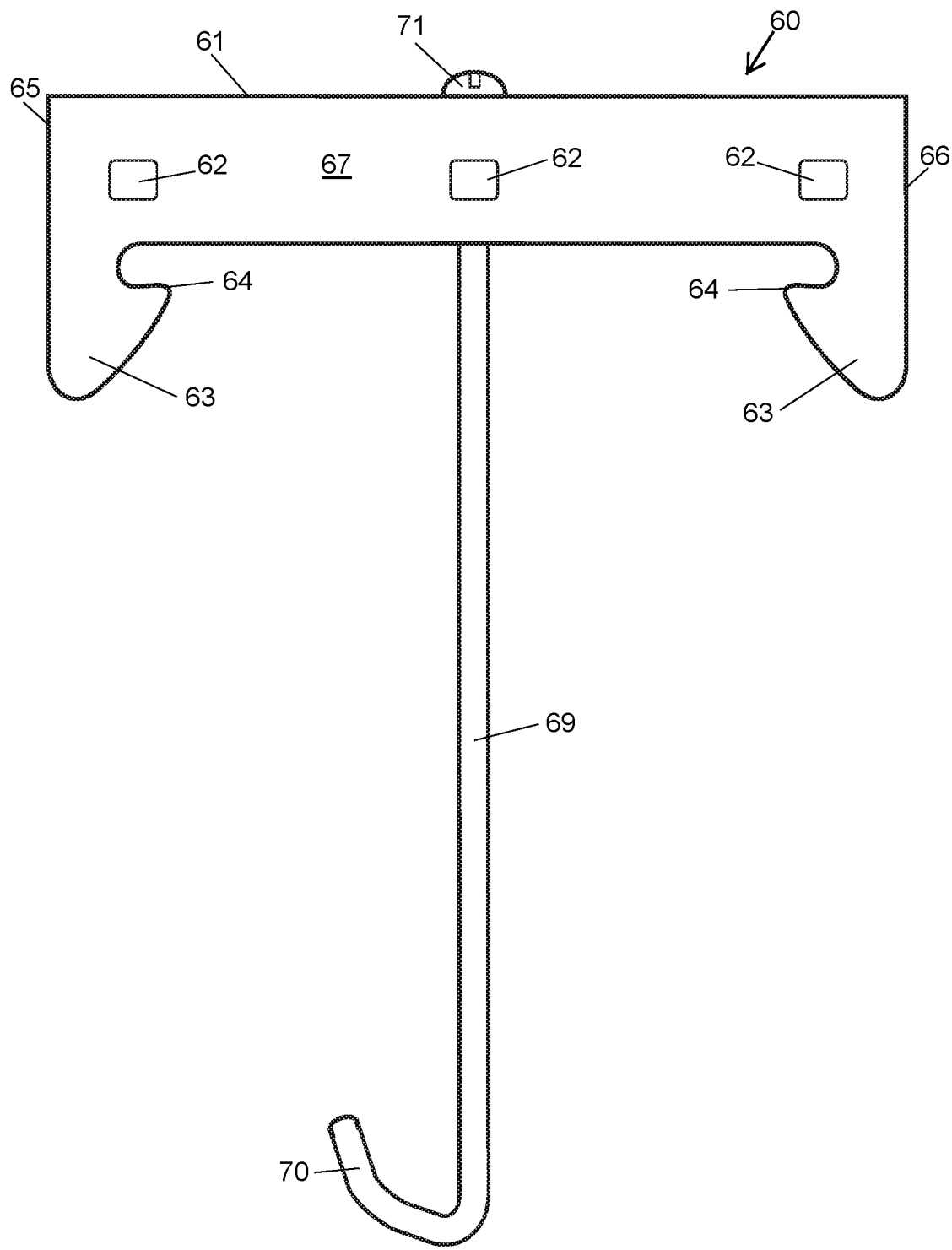
FIG. 5 shows a perspective side front view of a hanger clip used for securing the exposed grid tees to the top cross channel in accordance with a further embodiment of the present invention.
Figure 6:
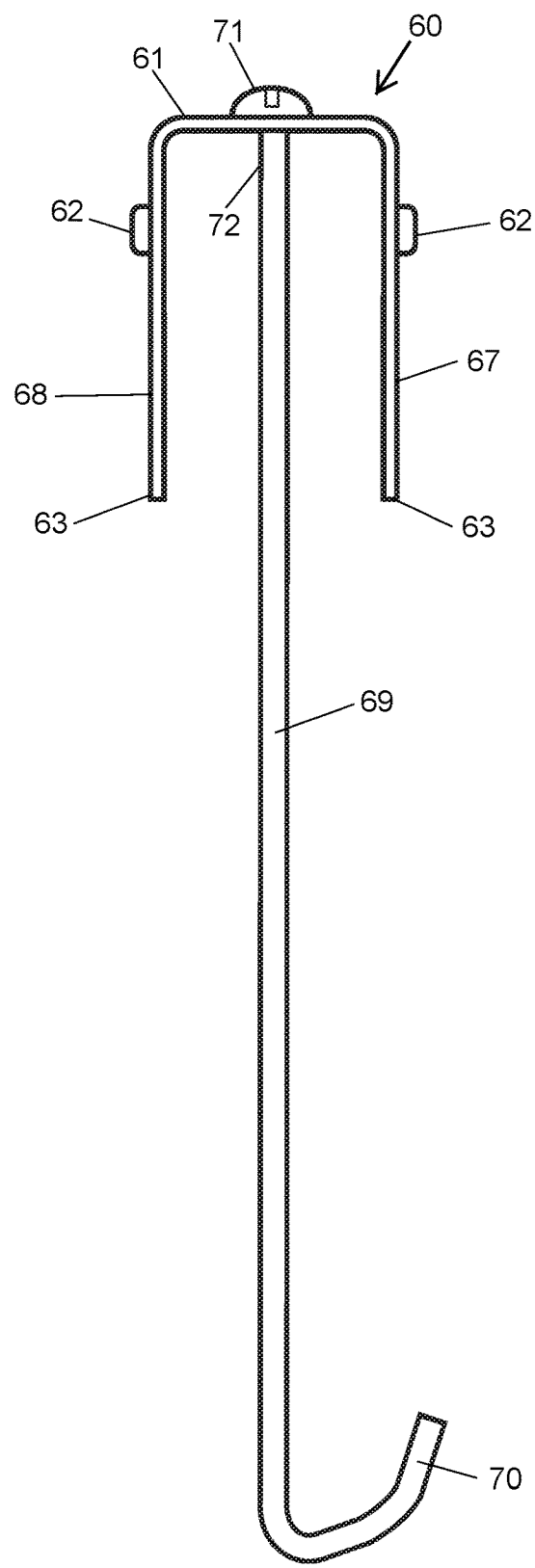
FIG. 6 shows an end view of the hanger clip of FIG. 5.
Figure 7:
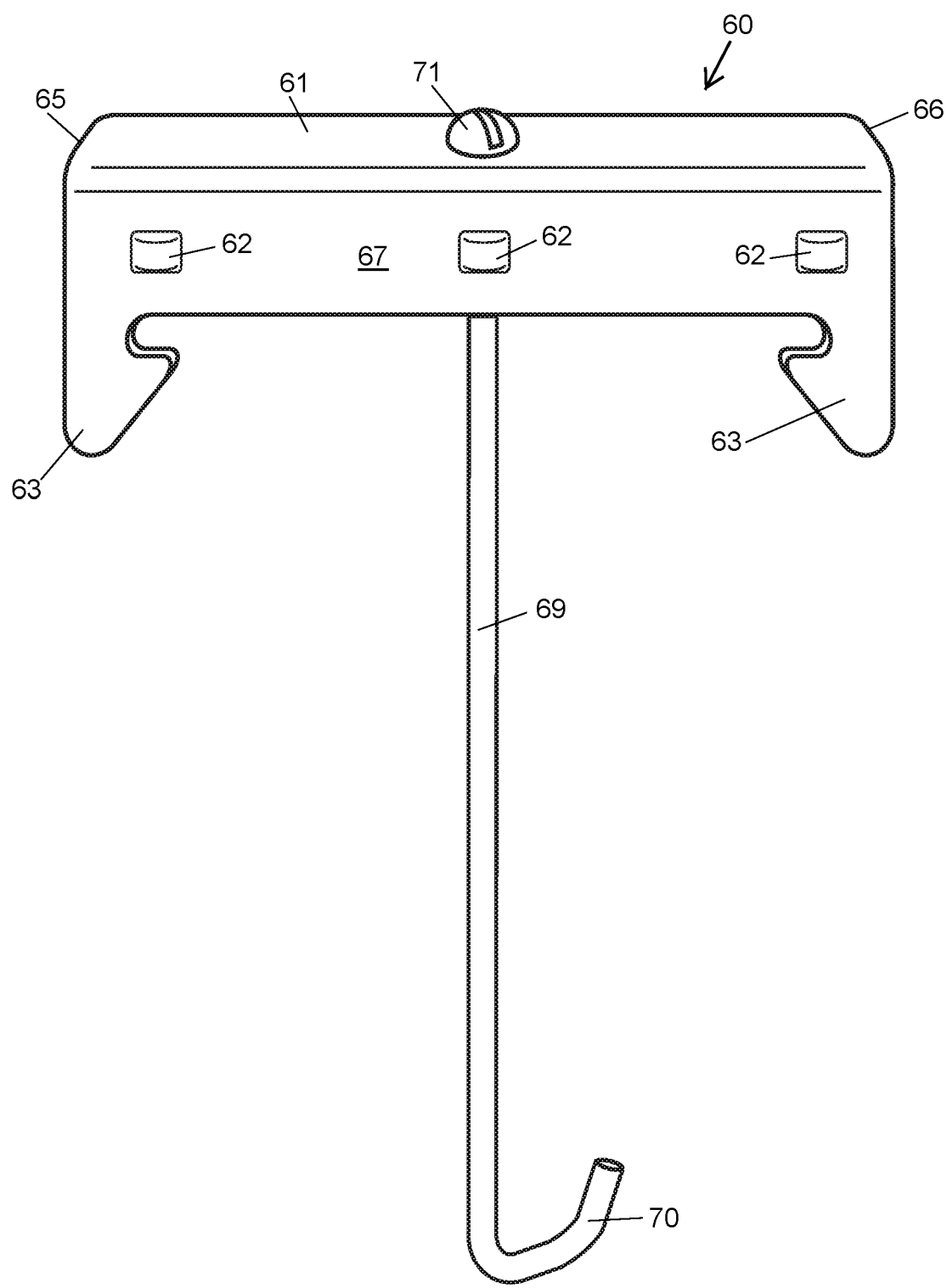
FIG. 7 illustrates a perspective view of the hanger clip of FIG. 5.

FIGS. 5 to 7 illustrate a further embodiment of the present invention in which the hanger clip 60 is designed to snap engage within the top cross rail 13. Like the hanger clip 40 the hanger clip 60 is of a channel configuration so as to have a longitudinal base 61 extending from a first end 65 to a second end 66 and a pair of longitudinally extending flanges 67, 68 extending downwardly from the base 61. In this embodiment the flanges 67, 68 have three projections 62 or outwardly directed tabs 62 in each flange 67, 68. While three projections 62 are shown in FIGS. 5 to 7 any number of projections may be pressed from the flanges 67, 68 to support the hanger clip 60 within the top cross rail 13.

Each hanger clip 60 may be formed as a plate of sheet metal folded approximately U-shaped forming a channel configuration with a flat base 61 and a pair of flanges or arms 67, 68 which extend downwardly away from the base 61 of the hanger clip 60. The outer lower edge of each arm 67, 68 carries two longitudinally extending hook elements 63 which are located at either end of the arms 67, 68 at spaced positions on the hanger clip 60 and have their hooks 63 confronting each other. The bottom section of each flange 67, 68 includes the hooks 63 which project to an end point 64.

The hanger clip 60 differs from the hanger clip 40 only in how the upper end 72 of the suspension rod 69 is fixed within the aperture (not shown) of the base 61. The first end 72 abuts against the underside of the base 61 and is retained against the base 61 by a threaded fastener 71 passing through the aperture in the base 61 and engaging with a complementary threaded socket in the upper end of the suspension rod 69. In this case a screw 71 is secured into the threaded socket in the upper end 72 of the suspension rod 69 to secure the upper end 72 to the base 61 of the hanger clip 60. The lower end 70 of the suspension rod 69 has a hook 70 which releasably engages the opening 33 in the support runner 30.

Figure 11:
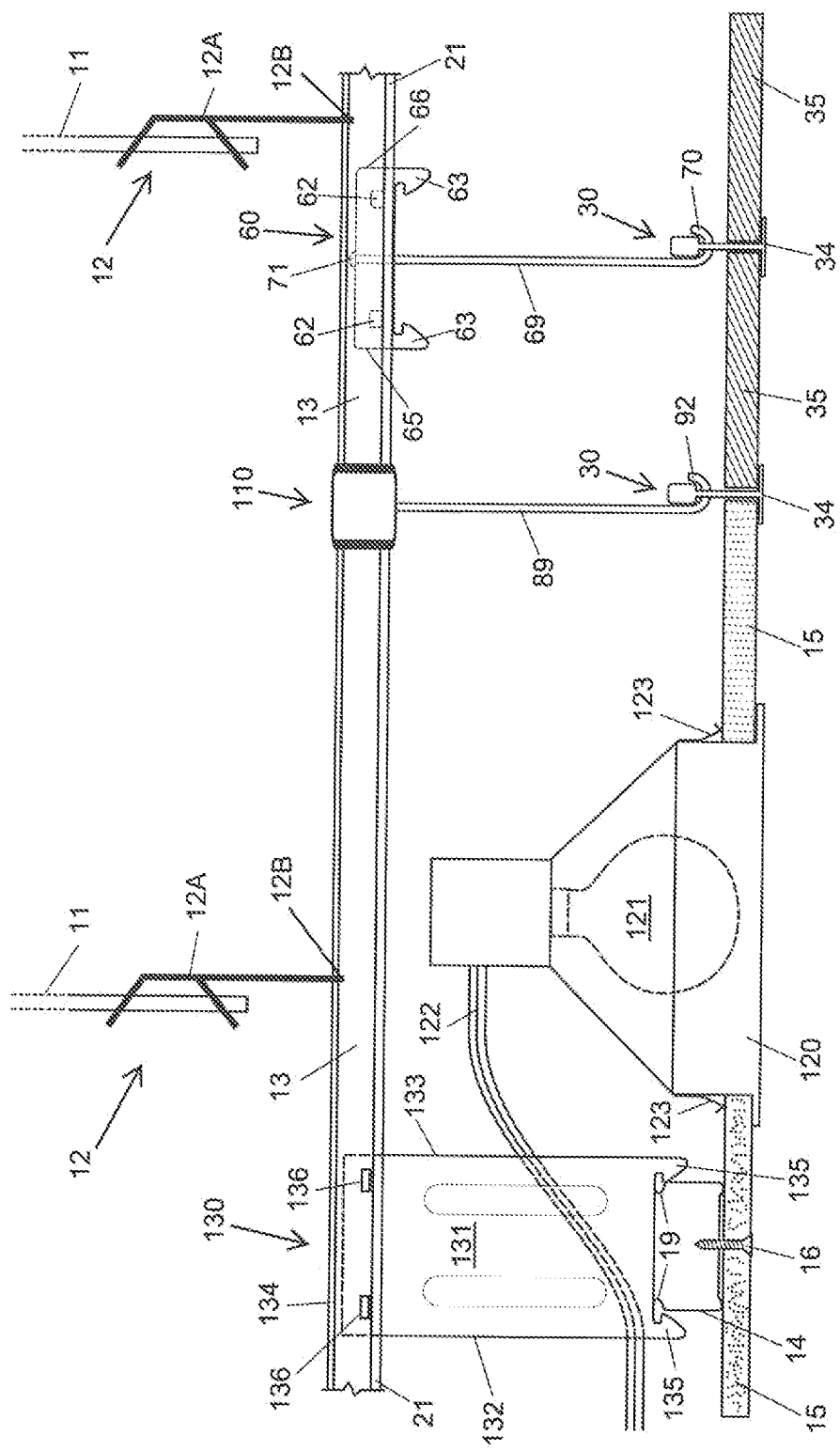
FIG. 11 illustrates a side view of a combined suspended ceiling showing a light mounted in the ceiling using a locking clip and the hanger clips of FIG. 5 and FIG. 10.

This design allows the base 61 and flanges 67, 68 to be interchanged with different length suspension rods 69 in order to provide the clearances of different lengths between the top cross rail 13 and the bottom of the support runner 30 to which surface the ceiling panels 35 are supported upon. Therefore providing voids of different sizes in between the back side of the ceiling panel and the bottom of the top cross rail 13 allowing such items as speakers, lights and air-conditioning components to be easily installed as is shown in FIG. 11 below. Typically the suspension rods 69 range in size from 50 to 500 mm which provides the present invention with a void of approximately the same dimension.

In use the hanger clip 60 is inserted in an upward direction so that the ramp surfaces of the tabs 62 engage the jaws 21 of the top cross rail 13 in the same manner as that described above for the hanger clip 40.

Figure 8:
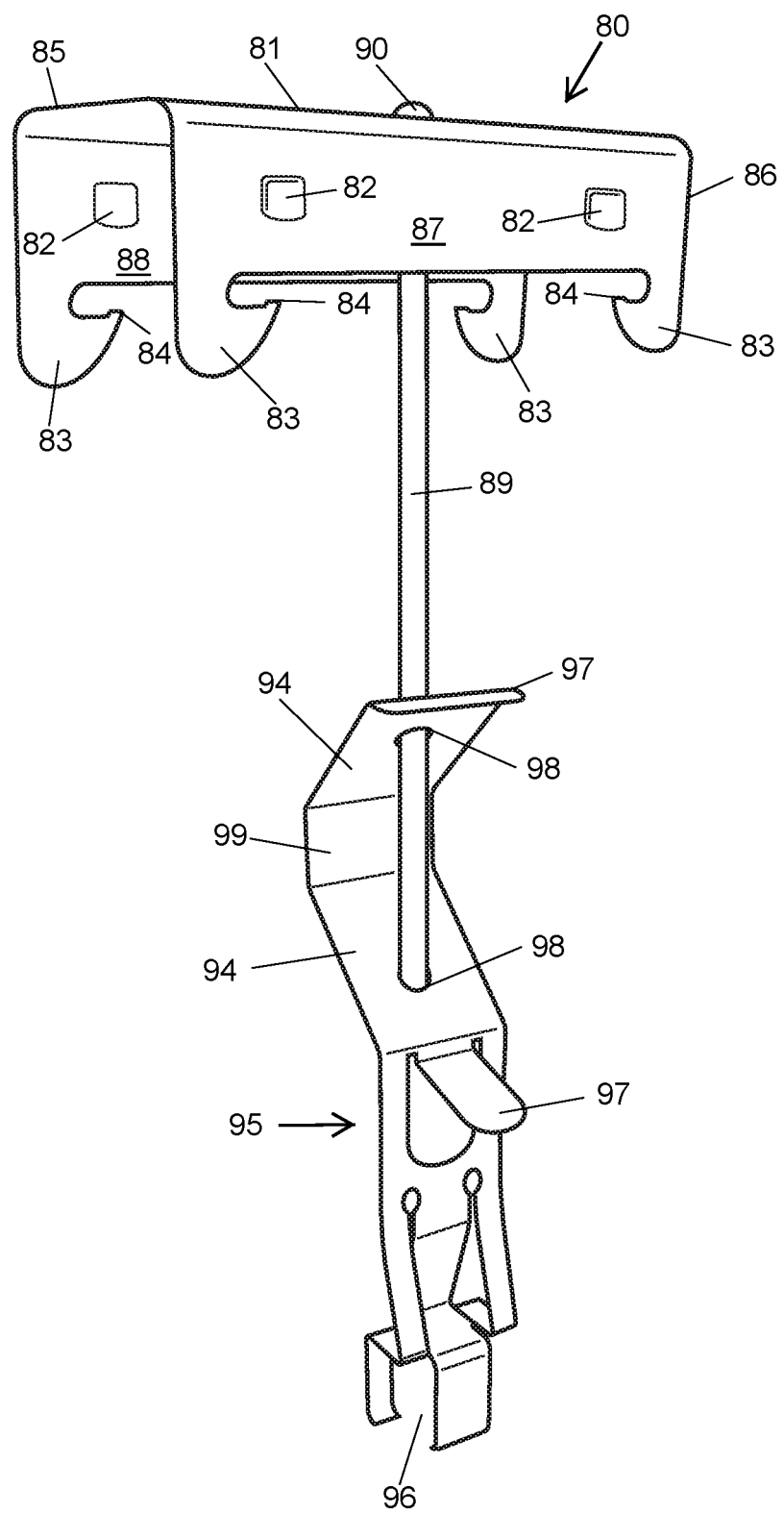
FIG. 8 shows a perspective view of a hanger clip used for securing the exposed grid tees to the top cross channel with a spring adjustable clip in accordance with a further embodiment of the present invention.

FIG. 8 shows a further embodiment of the present invention in which the hanger clip 80 is designed to snap engage within the top cross rail 13 and releasably connect to the top flange or bulb 31 of the support runner or tee 30. Like the hanger clip 60 the hanger clip 80 is of a channel configuration so as to have a longitudinal base 81 extending from a first end 85 to a second end 86 and a pair of longitudinally extending flanges 87, 88 extending downwardly from the base 81. In this embodiment the flanges 87, 88 have two projections 82 or outwardly directed or pressed tabs 82 in each flange 87, 88. Each hanger clip 80 may be formed as a plate of sheet resilient material folded approximately U-shaped forming a channel configuration. Like the hanger clips 40, 60 the outer lower edge of each arm 87, 88 carry two longitudinally extending hook elements 83 which are located at either end of the arms 87, 88 at spaced positions on the hanger clip 80 and have their hooks 83 confronting each other. The bottom section of each flange 87, 88 include the hooks 83 which project to an end point 84.

The hanger clip 80 connects the first end (not shown) of the suspension rod 89 in the same manner as the hanger clip 60. The first end abuts against the underside of the base 81 and is retained against the base 81 by a threaded fastener 90 passing through the aperture in the base 81 and engaging with a complementary threaded socket in the end of the suspension rod 89. This allows the base 81 and flanges 87, 88 to be interchanged with different length suspension rods 89 in order to provide varying clearance between the top cross rail 13 and the bottom of the support runner 30 to which surface the ceiling panels 35 are supported upon. It also allows the easy transition in height should the ceiling height changeover the ceiling system.

The embodiment illustrated in FIG. 8 differs in how the hanger clip 80 connects to the support runner 30. As shown a spring adjustable clip 95 is moveably mounted to the lower end of the suspension rod 89. The spring adjustable clip 95 at the top includes a base 99 which is generally planar and vertically orientated. Integrally formed with the base 99 and projecting therefrom are two flanges 94. The flanges 94 converge towards the base 99 and are also generally planar. Both flanges 94 have vertically aligned apertures 98. The spring adjustable clip 95 is formed from resiliently deformable material such as a sheet metal made from aluminium or steel or a high density plastic material. The flanges 94 are therefore resiliently attached to the base 99.

Passing through the vertically aligned apertures 98 is the lower end of the suspension rod 89. With the suspension rod 89 in position passing through the apertures 98, the flanges 94 are resiliently urged apart so that the edges of the apertures 98 securely engage the suspension rod 89 to fix the suspension rod 89 relative to the base 99. To provide height adjustment of the spring adjustable clip 95 on the suspension rod 89, a user grips the tabs 97 on the flanges 94 and pivots them towards each other. This releases the suspension rod 89 and allows vertical adjustment of the spring adjustable clip 95 on the suspension rod 89. When the tabs 97 are released they allow the flanges 94 to again resiliently return to a position of engagement with respect to the suspension rod 89.

The bottom of the spring adjustable clip 95 is designed to releasably engage the bulb 31 at the upper extremity of the web 36 of the support runner or tee 30. As described above the support runner or tee 30 is formed of a strip of material with the upper flange or bulb 31 formed in a closed box shape to provide the bulb 31. The upper flange or bulb 31 is shaped to be received within the jaws 96 of the spring adjustable clip 95. The jaws 96 like the flanges 94 are resiliently formed so as to allow a user to open and close the jaws 96 to clasp and release the bulb 31.

Like previous embodiments the hanger clip 80 is designed to allow the base 81 and flanges 87, 88 to be interchanged with different length suspension rods 89 in order to provide the varying clearance between the top cross rail 13 and the bottom of the support runner 30 to which surface the ceiling panels 35 are supported upon. The different length suspension rods 89 allow the creation of voids of different size between the back side of the ceiling panel 35 and the bottom of the top cross rail 13.

Figure 9:
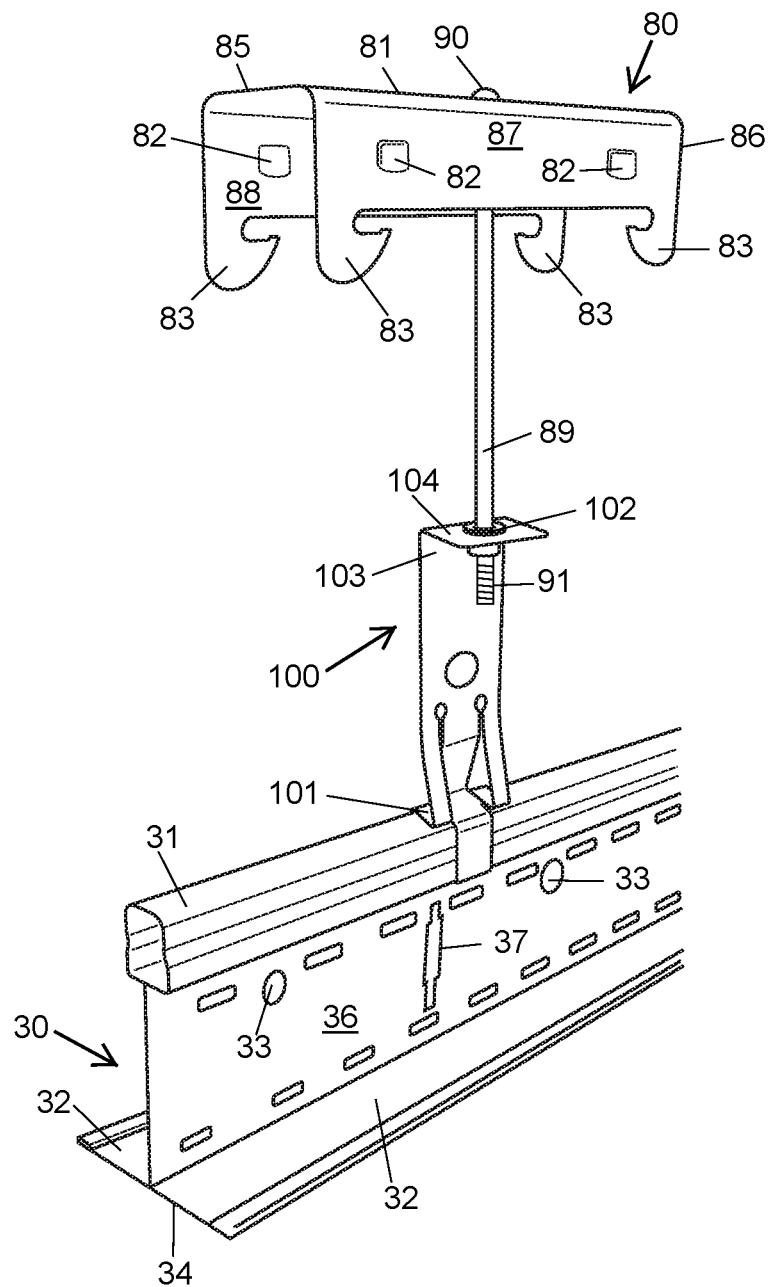
FIG. 9 illustrates a perspective view of a hanger clip used for securing the exposed grid tee to the top cross channel with a screw adjustable clip attached to a grid tee in accordance with a further embodiment of the present invention.

FIG. 9 shows a further embodiment of the present invention in which the hanger clip 80 is designed to snap engage within the top cross rail 13 and releasably connect to the top flange or bulb 31 of the support runner or tee 30. This embodiment differs from FIG. 8 in that a thread adjustable clip 100 replaces the spring adjustable clip 95. As above, the hanger clip 80 connects the upper end (not shown) of the suspension rod 89 in the same manner as the hanger clip 60. The upper end abuts against the underside of the base 81 and is retained against the base 81 by a threaded fastener 90 passing through the aperture in the base 81 and engaging with a complementary threaded socket in the upper end of the suspension rod 89. The lower end of the suspension rod 89 has a thread 91 formed at the lower end for engagement with a complementary threaded socket 102 of the thread adjustable clip 100.

The thread adjustable clip 100 has a top section formed by base 103 which is generally planar and vertically orientated. Integrally formed with the base 103 and projecting therefrom is mounting plate 104. The mounting plate 104 is formed at one end of the base 103 and forms a right angle with the base 103. The mounting plate 104 has a centrally located aperture which contains the threaded socket 102 for mounting the lower end of the suspension rod 89. The bottom of the thread adjustable clip 100 is designed to releasably engage the bulb 31 at the upper extremity of the web 36 of the support runner or tee 30. As described above the support runner or tee 30 is formed of a strip of material with the upper flange or bulb 31 formed in a closed box shape to provide the bulb 31. The upper flange or bulb 31 is shaped to be received within the jaws 101 of the thread adjustable clip 100. The jaws 101 are resiliently formed so as to allow a user to open and close the jaws 101 to clasp and release the bulb 31.

FIGS. 10a to 10c show a further embodiment of the present invention in which the hanger clip 110 is designed to snap engage with the top or over the top of the top cross rail 13 and releasably connect to the support runner or tee 30. The way in which the respective suspension rods 89 with their different support runner connectors 92, 95, 100 connects to the hanger clip 110 and the support runners 30 are the same as those described previously in relation to FIGS. 5 to 9.

The hanger clip 110 consists of a substantially U-shaped channel configuration so as to have a longitudinal base 111 extending from a first end to a second end and a pair of longitudinally extending flanges 113, 114 extending downwardly from the base 111. The hangar clip 110 is formed in an approximate U-shape and is manufactured from a resiliently deformable material. For example, the resiliently deformable material could be a sheet metal made from aluminium or steel or a high density plastic material. Each flange 113, 114 has at least one projection 112 pressed inwardly from the flanges 113, 114. The projection or tab 112 is designed to engage with an external portion and underneath the top hat section of the top cross rail 13 to inhibit removal of the hanger clip 110 from the top cross rail 13. In order to remove or move the hanger clip 110 the flanges 113, 114 are resiliently deformed to disengage the tabs 112 from the top cross rail 13 and allow the hanger clip 110 to move freely along the top cross rail 13 or be removed from the top cross rail 13.

From one flange 113 a suspension rod mounting plate 115 extends at right angles to an end of the flange 113, such that the suspension rod mounting plate 115 projects underneath the top cross rail 13. An aperture in the suspension rod mounting plate 115 is located so that the fastener 116 for securing the upper end of the suspension rod 89 is substantially aligned with a plane passing vertically through the centre of the top cross rail 13. This ensures that any weight attached to the suspension rod 89 is evenly distributed beneath the top cross rail 13 and also avoids any rolling or twisting of the top cross rail 13.

As above, the hanger clip 110 connects the upper end of the suspension rod 89 in a similar manner as the hanger clips 60, 80. The upper end of the suspension rod 89 abuts against the underside of the suspension rod mounting plate 115 and is retained against the plate 115 by a threaded fastener 116 passing through the aperture in the suspension rod mounting plate 115 and engaging with a complementary threaded socket 93 in the upper end of the suspension rod 89. The lower end of the suspension rod 89 is as described previously with reference to FIGS. 6 to 9. The lower end of the suspension rod 89 will either have a hook 92 for engaging the opening 33 in the support runner 30, a spring adjustable clip 95 or a thread adjustable clip 100 for releasably engaging the top flange 31 of the support runner or tee 30.

Each of the hook 92, spring adjustable clip 95 or the thread adjustable clip 100 attached to the suspension rods 89 are interchangeable on the hanger clip 110. Dependent upon the cost, weight, amount of clearance required and loading requirements for the suspended ceiling will determine the actual type of hanger clip used and how the hanger clip connects to the support runner 30.

FIG. 11 illustrates the use of hanger clips 60, 110 and the key lock clip 130 in a combined concealed and exposed suspended ceiling grid system. The common elements in both suspended systems are the top cross rail 13, the suspension hangers 12 and ceiling suspension rods 11. As described previously the suspension hangers 12 are a "U" shaped spring clip or apertured bowed leaf spring 12A with diverging free arms. The spring clip 12A is riveted at its base to a vertical plate forming the body of the hanger 12. Holes are provided near the ends of the arms and a ceiling suspension rod 11 is passed through said holes so that the hanger 12 is locked upon said rod 11 by the impinging action of the spring arms on the rod 11. As the arms are displaced towards one another the rod 11 will be released so that the hanger 12 can be slid up or down the rod 11. The lower end of the hangar body plate is slotted to from inwardly directed books 12B to attach the hangar 12 to the top cross rail 13. This allows the top cross rail 13 to be adjustably suspended from fixing points (not shown) on a support structure such as a roof or upon floor beams located above the suspended ceiling.

The top cross rail 13 has a longitudinal top and a pair of generally parallel and co-extensive flanges. The flanges project generally downwardly from the top and provide a longitudinally extending cavity into which the clips 60 and 130 project. Each of the flanges terminates along its lower edge with an upwardly extending in-turned longitudinal jaw portion 21. The longitudinal portions 21 are adapted to engage with the tabs 62, 136 of the clips 60, 130. The hanger clip 110 is designed to snap-engage over the top of the top cross rail 13.

In the concealed ceiling component of the combined suspended ceiling system a key lock clip 130 is utilised to mount a light 120 with a light bulb or recessed light fitting 121 and mounting clip 123 are mounted in the plasterboard panel 15 and located within the void between the bottom of the top cross rail 13 and the backside of the plasterboard panel 15. The clip 130 is of a channel configuration so as to have a longitudinal base 134 extending from a first end 132 to a second end 133 and a pair of longitudinally downwardly extending flanges 131. The base 134 has an inner (lower) surface and an outer (upper) surface. Each of the flanges 131 is provided with one or more projections 136 or outwardly directed tabs 136. In this embodiment the projections 136 are pressed from the flanges 131 to form tabs or ramp surfaces 136. The projections 136 are located on the outside of the flanges 131 adjacent to the base 134 of the clip 130. The clip 130 also has at least one and preferably two strengthening elements in each flange 131. The strengthening elements are formed by stamping or pressing the sheet metal.

Each clip device 130 is formed as a plate of sheet metal folded to approximately form a U-shaped channel configuration. The outer lower edge of each arm 131 carries two longitudinally extending hook elements 135. Each hook element 135 is located at opposing ends of each arm 131 at spaced apart positions on the clip device 130, with each hook 135 being inwardly orientated towards each other. The hook elements 135 connect with the out-turned opposing longitudinal jaws 19 extending from the furring channels 14.

The length of the flanges or arms 131 are designed to space apart the furring channel 14 from the bottom of the top cross rail 13 in order to provide clearance or a void therebetween. A first void is formed between the top cross rail 13 and the furring channel 14 when the clip 130 is secured within the longitudinal slot of the top cross rail 13 and connected to the furring channel 14. A first void is formed between the top cross rail 13 and the furring channel 14 and is sized to allow clearance for mounting of components 120 in a second void formed between the backside of the plasterboard panel 15 supported beneath the furring channel 14 and the bottom of the top cross rail 13. The component, in this case the light 120 is mounted through or retained within the plasterboard panel 15. Different length arms 131 of the clip 130 provide different sized voids for the mounting of components 120 within the space provided by the void. Typically the clips 130 are provided with arms 131 ranging in size from 50 to 500 mm which provide voids of similar dimensions.

Alternatively, the length measured from the base 134 to the bottom of the hooks 135 of each arm or flange 131 is sized so as to provide the clearance between the top cross rail 13 and the bottom of the furring channel 14 to which surface the plasterboard 15 is fixed. This provides a void in between the backside of the plasterboard 15 and the bottom of the top cross rail 13. The void allows the flush mounting of the light 120 but could also include such items as speakers and air conditioning components into and through the plasterboard 15.

In the exposed suspended ceiling side of the combined suspended ceiling, two hanger clips 60, 110 are shown suspending the support runner or tee 30 from the top cross rail 13. As described above in relation to FIGS. 5 to 7 the hanger clip 60 is designed to snap engage within the top cross rail 13. The hanger clip 60 is of a channel configuration so as to have a longitudinal base 61 extending from a first end 65 to a second end 66 and a pair of longitudinally extending flanges 67, 68 extending downwardly from the base 61. The flanges 67, 68 have two projections 62 or outwardly directed tabs 62 in each flange 67, 68 which when the hanger clip 60 is inserted in an upward direction into the top cross rail 13 the ramp surfaces of the tabs 62 engage the jaws 21 of the top cross rail 13 to inhibit the removal of the hanger clip 60 from the top cross rail 13.

The hanger clip 60 has a suspension rod 69 with an upper end 72 which abuts against the underside of the base 61 and is retained against the base 61 by a threaded fastener or screw 71 passing through the aperture in the base 61 and engaging with a complementary threaded socket in the upper end of the suspension rod 69. The lower end 70 of the suspension rod 69 has a hook 70 which releasably engages the opening 33 in the support runner 30. Different length suspension rods 69 provide the clearance between the top cross rail 13 and the bottom of the support runner 30 to which surface the ceiling panels 35 are supported upon. A first void is formed between the top cross rail 13 and the support runner 30 when the hanger clip 60 is secured within the longitudinal slot of the top cross rail 13 and connected to the support runner 30. The first void formed between the top cross rail 13 and the support runner 30 is sized to allow clearance for mounting of components such as speakers, lights and air-conditioning components to be easily installed in a second void formed between the backside of the ceiling panel 35 held within the support runner 30 and the bottom of the top cross rail 13. The components are typically mounted through or retained within the ceiling panel 35. Typically the suspension rods 69 range in size from 50 to 500 mm which provides the present invention with voids of approximately the same dimension.

Likewise the hanger clip 110 as described above in relation to FIG. 10*a*, the hanger clip 110 is designed to snap engage with the top or over the top of the top cross rail 13 and releasably connect to the support runner or tee 30. In FIG. 11 the suspension rod 89 has a hook 92 which releasably connects to the opening 33 in the support runners 30.

The lengths of the respective suspension rods 69, 89 connected to the hanger clips 60, 110 support the ceiling panels 35 at the same distance from the top cross rail 13 as the key clip 130 supports the plasterboard panel 15 from the top cross rail 13. That is, the plasterboard 15 and the ceiling panels 35 are substantially located in a collinear line forming a combined suspended ceiling with a consistent flush finish.

When mounting components in the voids between the top cross rail 13 and the backsides of the ceiling panel 35 and the plasterboard panel 15, it is often required to also route or mount auxiliary items such as electrical wiring conduits 122 and air conditioning ducting and registers in the voids. These can be mounted either behind or in front of the hanger clips 40, 60, 80, 110, 130, 200.

As would be appreciated a number of different items can be either mounted on the plasterboard 15, mounted on the ceiling panel 35, mounted within the void of a combined exposed and concealed suspended ceiling or suspended from the plenum behind the plasterboard 15 and ceiling panel 35. For example, air conditioning plenum boxes and cushion boxes may be mounted in the void formed between the top cross rail 13, the support runner 30 and the furring channel 14. These boxes typically are used to either supply air or return air in the air conditioning system and sit above the air conditioning registers within the ceiling space.

Figure 17:
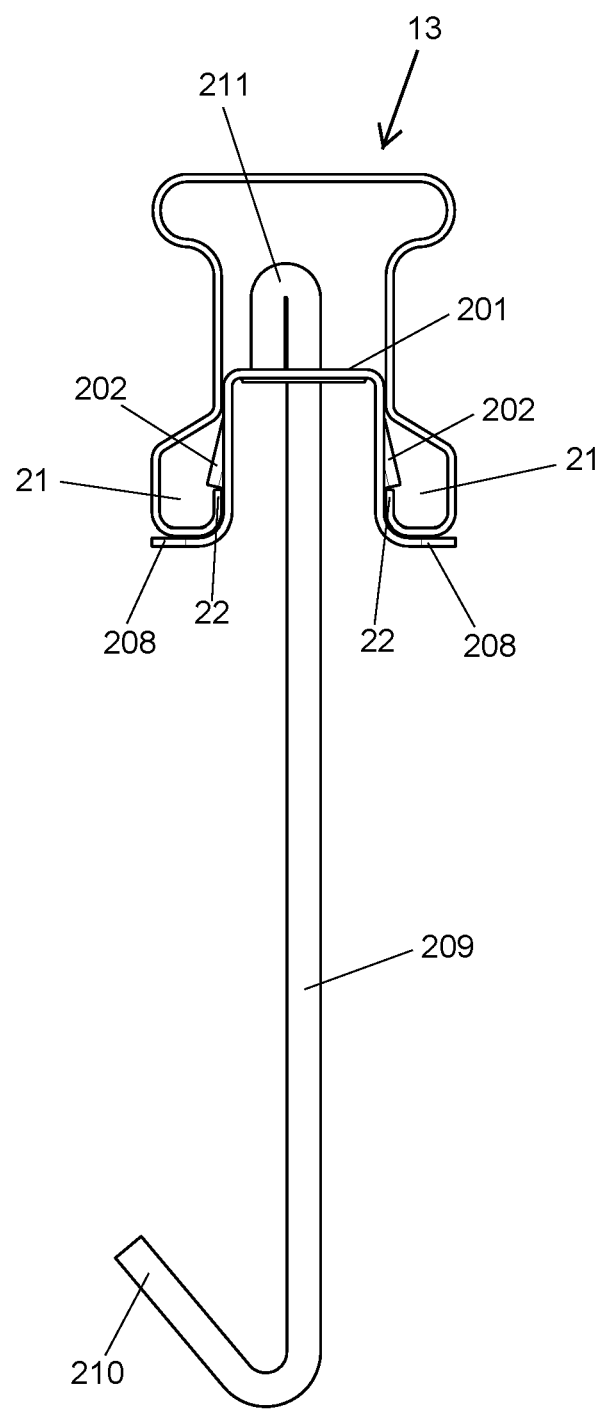
FIG. 17 illustrates the hanger clip of FIG. 12 installed within a top cross rail.

FIGS. 12 to 17 illustrate a further embodiment of the present invention in which a hanger clip 200 is designed for mounting within a top cross rail 13 and to a support runner or tee 30. The hanger clip 200 is designed to snap engage within the longitudinal slot of the top cross rail 13. As illustrated in FIG. 17 the top cross rail 13 has a longitudinal top and a pair of generally parallel and co-extensive flanges. The flanges project generally downwardly from the top and provide a longitudinally extending cavity into which the hanger clip 200 will project. Each of the flanges terminates along its lower edge with an upwardly extending in-turned longitudinal portion or jaws 21. The longitudinal portions 22 or jaws 21 are adapted to engage with the tabs 202 of the hanger clip 200.

Figure 12:
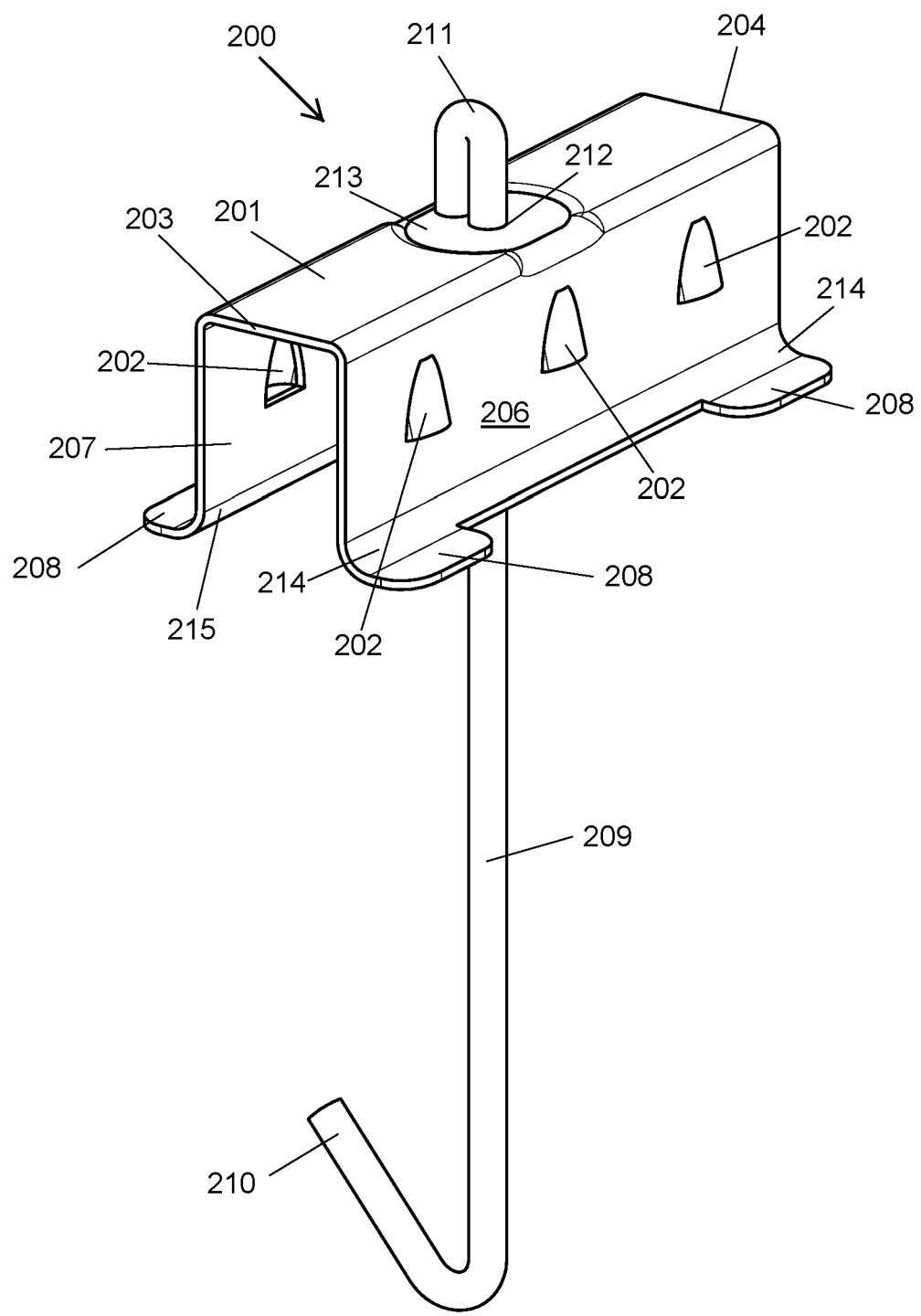
FIG. 12 shows a perspective view of a hanger clip used for securing the exposed grid tees to the top cross channel in accordance with a still further embodiment of the present invention.
Figure 13:
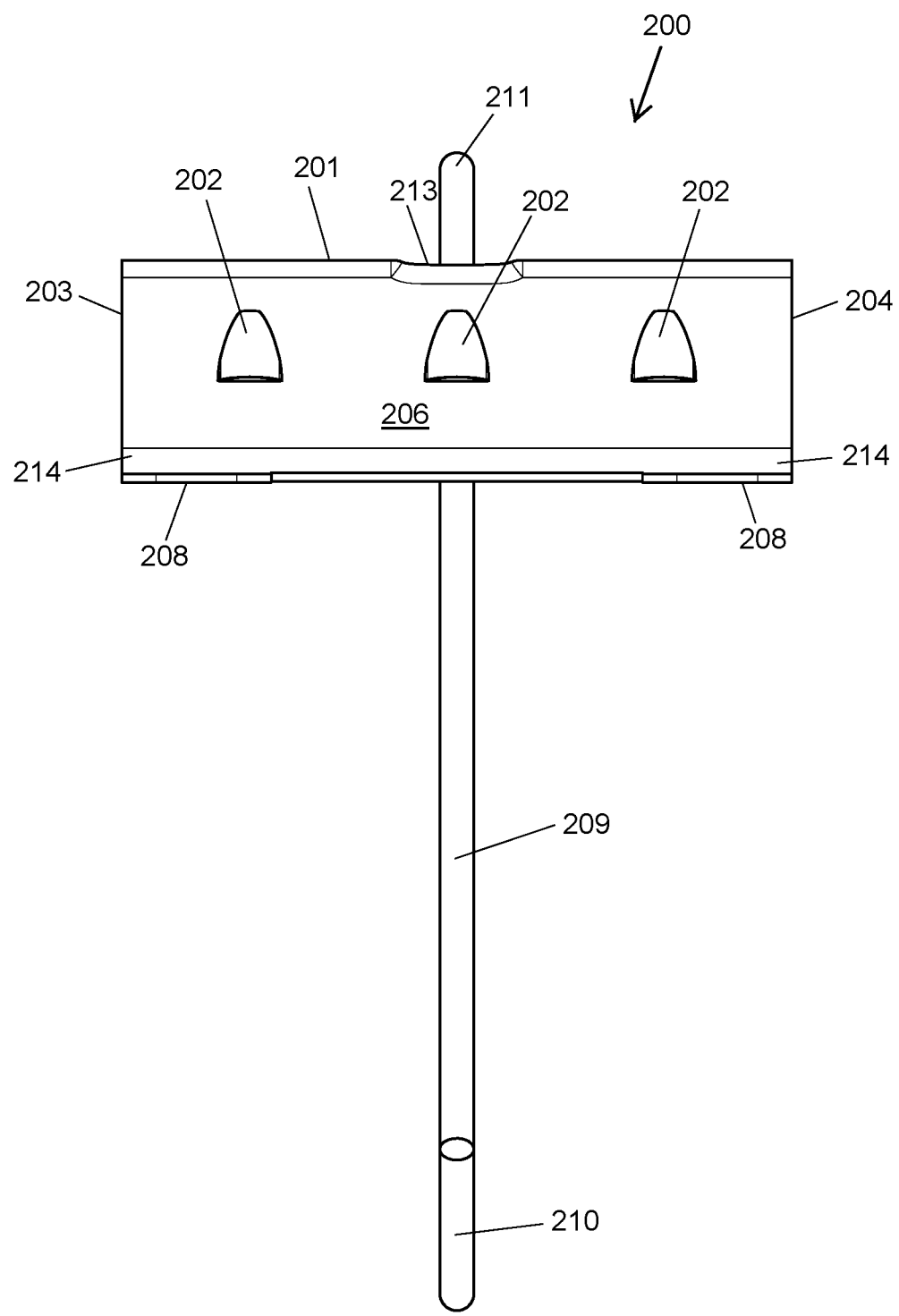
FIGS. 13 to 16 show front, top, bottom and end perspective views of the hanger clip of FIG. 12.
Figure 14:
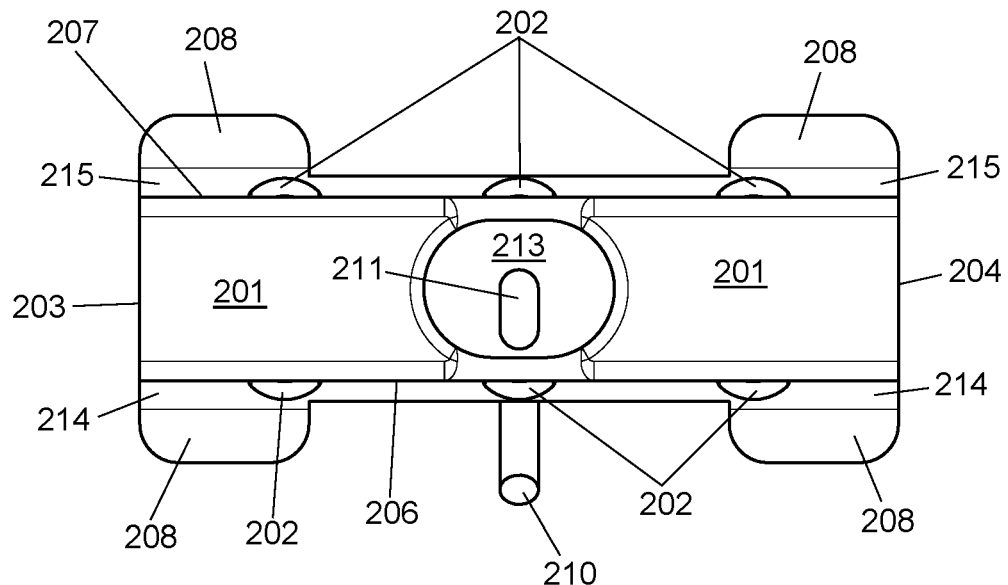
Figure 15:
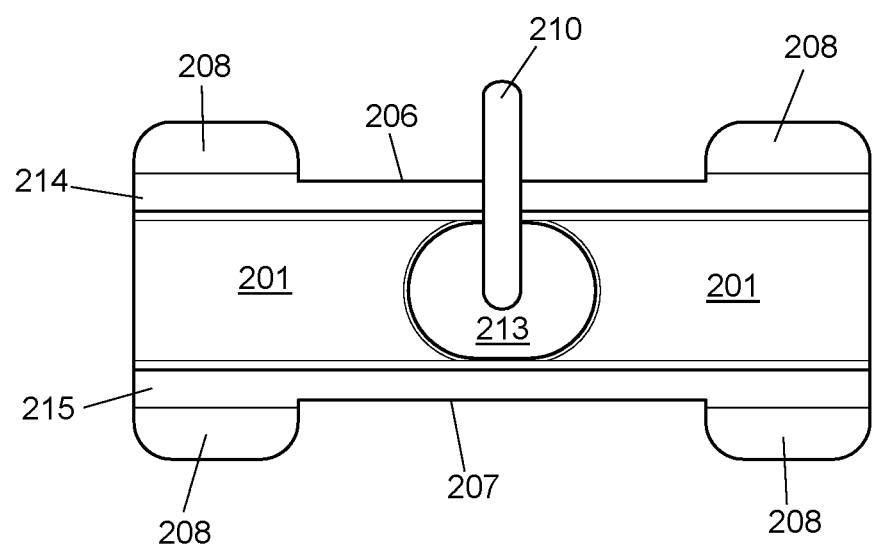
Figure 16:
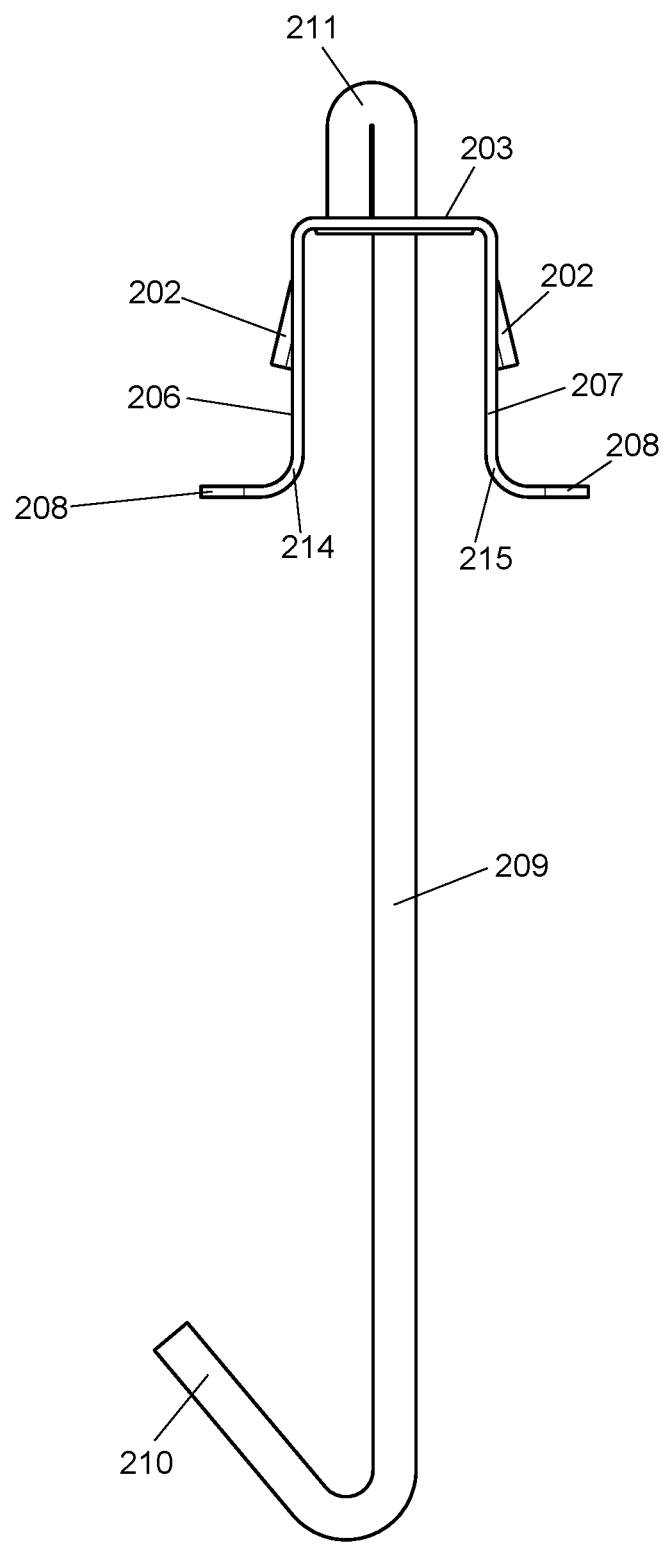

The hanger clip 200 is of a channel configuration so as to have a longitudinal base 201 extending from a first end 203 to a second end 204 and a pair of longitudinally extending flanges 206, 207. As shown in FIG. 12 the hangar clip 200 is formed in an approximate U-shape and is manufactured from a resiliently deformable material. The base 201 is located between the flanges 206, 207 with the flanges 206, 207 extending vertically down from the base 201. Extending substantially horizontally from the lower ends of each flange 206, 207 are edge portions 214, 215 which have the horizontal tabs 208 extending therefrom. When the hanger clip 200 is inserted into the top cross rail 13 the tabs 208 engage and sit flush against with a bottom surface of the in-turned longitudinal jaws 21 of the top cross rail 13. The base 201 also has a centrally located aperture 212. The aperture 212 is centrally positioned on a pad 213 which is located equidistant between the first and second ends 203, 204 of the base 201. The positioning of the aperture 212 is designed to balance the suspended weight of the grid structure of the support runners 30 which are suspended below.

Each flange 206, 207 is provided with one or more projections 202 or outwardly directed tabs 202. In this embodiment three projections 202 are pressed from each flange 206, 207 to form a tab or ramp surface 202. The tabs 202 are located on the outside of the flanges 206, 207 and centrally located between the base 201 and tabs 208 of the hanger clip 200. The lower edge of each projection 202 is located to form an aligned vertical surface on each flange 206, 207. As illustrated in FIG. 17, when inserted into the top cross rail 13 the lower edge of each projection 202 sits upon the terminal end portion 22 of each in-turned longitudinal jaw 21 of the top cross rail 13. Likewise the tabs 208 engage and sit flush against with a bottom surface of the in-turned longitudinal jaws 21 of the top cross rail 13.

The suspension rod 209 has two ends 210, 211, the upper end 211 is designed to engage with the aperture 212 in the base 201 and the lower end 210 has the attachment means from which the support rail or tee 30 is suspended therefrom. The aperture 212 in the base 201 is sized to receive the upper end 211 of the suspension rod 209 and as illustrated allows the upper end 211 to pass through the aperture 212. The upper end 211 is then bent back through an angle of approximately 180 degrees with reference to the longitudinal axis of the suspension rod 209 such that the end of the suspension rod 209 is folded back upon itself and is seated upon the pad 213. With the upper end 211 of the suspension rod folded back upon itself onto the pad 213 allows the suspension rod 209 to be effectively rotated to any position around the pad 213. This also allows the hook end or lower end 210 to be positioned to any position, which is beneficial when connecting to the support rail or tee 30. Preferably, the angle through which the upper end 211 is bent is within the range of 150 to 180 degrees. This prevents the upper end 211 from being removed from the aperture 212 in the hanger clip 200. As shown in FIG. 17 when the hanger clip 200 is snap fitted into the top cross rail 13 the upper end 211 of the suspension rod 209 sits within the cavity formed between the underside of the top cross rail 13, the pair of generally parallel and co-extensive flanges of the top cross rail 13 and the top side of the base 201 of the hanger clip 200.

The lower end 210 in FIGS. 12 to 17 has the attachment means which is shown as a hook. The hook is designed to releasably engage the openings 33 in the central web 36 of the support runner or tee 30. This allows the support rail 30 to be suspended from the top cross rail 13. Alternatively, the hook may be replaced with a straight section of longitudinally extending rod 209 and the attachment means located at the lower end 210 may have a threaded socket located within the lower end 210 of the suspension rod 209. The threaded socket could be used as an attachment to a complementary threaded shaft attached to a thread adjustable suspension clip or a spring adjustable suspension clip. Likewise, the lower end 210 of the suspension rod 209 may have an external thread for engaging with a complementary threaded socket of a thread adjustable suspension clip. In a still further alternative, the lower end 210 attachment means could simply be a straight section of the suspension rod 209 which could be adapted to engage an apertured bowed leaf spring of a spring adjustable suspension clip.

As illustrated, the suspension rods 209 are manufactured from steel rod or a high density plastics material. The hooks 210 are typically bent through an angle in the range of approximately 10 to 180 degrees with respect to the longitudinal axis of the suspension rod 209. The suspension rod 209 extends a pre-determined distance from the base 201 so as to space apart the top cross rail 13 and the support runner or tee 30 to provide a void therebetween. The void formed between the top cross rail 13 and the support runner or tee 30 is sized to allow the flush mounting or mounting of components within the ceiling panel 35 and the void. Typically the suspension rods 209 range in lengths from 50 to 500 mm which in use provides the present invention with a void of approximately the same dimension.

In use the hanger clip 200 is inserted in an upward direction so that the ramp surfaces 202 of the hanger clip 200 engage with and push past the longitudinally extending jaws 21 of the top cross rail 13. Due to resilient nature of the flanges 206, 207 and the sides of the top cross rail 13 the hanger clip 200 is pushed upward to locate within the longitudinal slot within the top cross rail 13. When the projections 202 of the hanger clip 200 move past the longitudinally extending jaws 21, the hanger clip 200 snap engages into the slot within the top cross rail 13 between the jaws 21 with the tabs 208 sitting flush against the bottom surface of each jaw 21. The terminal ends 22 of the jaws 21 engage with the bottom of the projections 202 and substantially retain the projections 202 within the jaws 21 as best seen in FIG. 17. The projections 202 inhibit removal of the hanger clip 200 from within the top cross rail 13 due to not being able to move in the direction opposite to the initial upward direction. The hanger clips 200 can be removed from the top cross rail 13 by pushing the hanger clip 200 in an upward direction and the resiliently deforming the flanges 206, 207 inwardly to allow the hanger clip 200 to be removed from the top cross rail 13. Likewise the hook 210 engages with the opening 33 in the support runners 30 to secure the support runners 30 in place. This then allows the ceiling panels 35 to be inserted within the frame formed at the bottom section of the support runner 30. The resilient nature of the flanges 206, 207 of the hanger clip 200 allow the hanger clip 200 to be free to slide along within the cavity of the top cross rail 13, therefore making the hanger clip 200 adjustable within the top cross rail 13.

Figure 18:
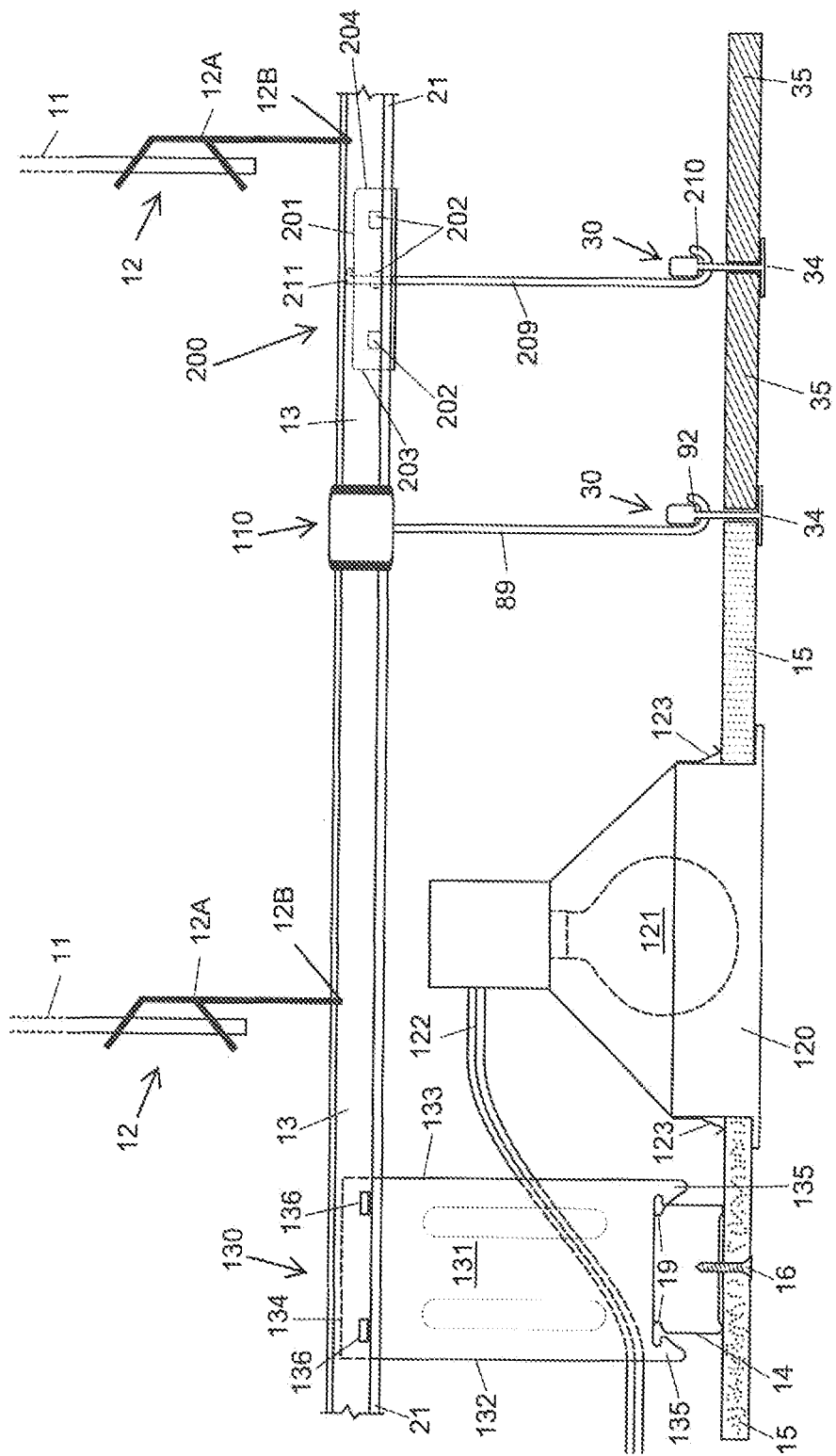
FIG. 18 illustrates a side view of a combined suspended ceiling showing a light mounted in the ceiling using a locking clip and the hanger clips of FIG. 10 and FIG. 12.

FIG. 18, like FIG. 11 illustrates the use of hanger clips 200, 110 and the key lock clip 130 in a combined concealed and exposed suspended ceiling grid system. The common elements in both suspended systems are the top cross rail 13, the suspension hangers 12, the apertured bowed leaf spring 12A and ceiling suspension rods 11. The suspension hangers 12 are a "U" shaped spring clip or apertured bowed leaf spring 12A with diverging free arms. The spring clip 12A is riveted at its base to a vertical plate forming the body of the hanger 12. Holes are provided near the ends of the arms and a ceiling suspension rod 11 is passed through said holes so that the hanger 12 is locked upon said rod 11 by the impinging action of the spring arms on the rod 11. As the arms are displaced towards one another the rod 11 will be released so that the hanger 12 can be slid up or down the rod 11. The lower end of the hangar body plate is slotted to form inwardly directed hooks 12B to attach the hangar 12 to the top cross rail 13. As described previously the suspension hangers 12 allows the top cross rail 13 to be adjustably suspended from fixing points (not shown) on a support structure such as a roof or upon floor beams located above the suspended ceiling.

The only difference between FIG. 18 and FIG. 11 is the use of the hanger clip 200 in place of the hanger clip 60. Likewise the positioning of the hanger clip 200 has previously been described in relation to FIG. 17 and the hanger clip 200 is designed to snap engage within the top cross rail 13. The hanger clip 200 has a suspension rod 209 with an upper end 211 which passes through the aperture 212 in the base 201 and is retained against the base 201 by the bending of the end of the suspension rod 209. The lower end 210 of the suspension rod 209 has a hook which releasably engages the opening 33 in the support runner 30. Different length suspension rods 209 provide the clearance between the top cross rail 13 and the bottom of the support runner 30 to which surface the ceiling panels 35 are supported upon. A first void is formed between the top cross rail 13 and the support runner 30 when the hanger clip 200 is secured within the longitudinal slot of the top cross rail 13 and connected to the support runner 30. The first void formed between the top cross rail 13 and the support runner 30 is sized to allow clearance for mounting of components such as speakers, lights and air-conditioning components to be easily installed in a second void formed between the backside of the ceiling panel 35 held within the support runner 30 and the bottom of the top cross rail 13. The components are typically mounted through or retained within the ceiling panel 35.

Other applications of the present invention include the use of the hanger clips 40, 60, 80, 110, 200 in combination with the clips 130 in a suspended ceiling system used when a bulkhead or boxed section is required. The term bulkhead is frequently used to denote any boxed in beam or other vertical wall extending down from a ceiling and by extension even the vertical face of an area of lower ceiling. Typically a bulkhead is used when an air-conditioning pipe, water and waste pipes or some other component which cannot be moved. In this case the suspended ceiling must be built around the exposed component. Bulkheads can also be used as ceiling features to show different heights in the ceiling.

In accordance with a further embodiment (not shown) the hanger clips 40, 60, 200 with suspension rods 47, 69, 209 have at their lower end a straight continuation or extension of the rods 47, 69, 209 therefore the second is free. They do not have the hooks 49, 70, 210 of the previously described embodiments. With a straight suspension rod 47, 69, 209 extending from the base 41, 61, 201 of the hanger clip 40, 60, 200 a further spring clip and an associated clip rod can be moveably positioned on the suspension rod, 47, 69, 209. The spring clip is moveably mounted on the lower end of the suspension rod 47, 69, 209. The spring clip has a base which is generally planar and vertically orientated. Integrally formed with the base and projecting therefrom are two flanges. The flanges converge towards the base and are also generally planar. Both flanges have vertically aligned apertures. The spring clip is formed from resiliently deformable material such as a sheet metal made from aluminium or steel or a high density plastic material. The flanges are therefore resiliently attached to the base.

Passing through the vertically aligned apertures is the lower end of the suspension rod 47, 69, 209. With the suspension rod 47, 69, 209 in position passing through the apertures, the flanges are resiliently urged apart so that the edges of the apertures securely engage the suspension rod to fix the suspension rod relative to the base. To provide height adjustment of the spring clip on the suspension rod, a user grips the tabs on the flanges and pivots them towards each other. This releases the suspension rod and allows vertical adjustment of the spring clip on the suspension rod. When the tabs are released they allow the flanges to again resiliently return to a positon of engagement with respect to the suspension rod. A further rod is attached through an aperture in the base of the spring clip which passes through a further aperture in one of the flanges. The further rod extends downwardly and has an end with a hook for engagement with the openings in the support runners 30.

In this embodiment the suspension rods 47, 69, 209 are of a pre-determined length to suit the suspended ceiling clearance required between the support runner 30 and the top cross rails 13.

As would be appreciated the hanger clips and the suspended ceiling components can be manufactured from any resiliently deformable material. That is a material which has the ability to absorb energy when it is deformed elastically, and release that energy upon unloading. For example any material which when subjected to a stress causes a change of dimensions in the material and upon release of the stress returns to substantially the same dimensions, such as sheet metal made from aluminium or steel. Another sheet product which is becoming popular for its lightweight and high strength to density ratio characteristics is high-density polyethylene (HDPE) or polyethylene high-density (PEHD) which is a polyethylene thermoplastic made from petroleum. The present invention can also be manufactured from HDPE or other plastic material which is capable of being resiliently deformed.

While the above shapes have been described in use, it should be understood that other shapes and sizes can be used without departing from the present invention. The size of the clips 40, 60, 80, 110, 200 and 130 may range from having suspension rods or flanges with a length or height ranging from 50 mm to 500 mm.

Likewise while a few applications have been described the present invention is not limited to only those applications. For example the present invention could also be used to produce a curved or raked ceiling or any cantilevered ceiling.

While the present invention has been described to provide a void for the flush mounted or ceiling mounted components such as lights, air-conditioning modules and speakers, it should be appreciated that a number of different components could be flush mounted or mounted within the ceiling which required a void behind the ceiling panel or plasterboard in order to be able to be correctly mounted. Therefor the present invention should not be limited to only those items described.

The positioning of and number of suspension hangers, top cross rails, furring channels, support runners and clips is dependent upon the particular suspended ceiling required and will typically be decided upon when the ceiling load is determined during the design process.

While the above suspended ceilings have typically been described regarding internal ceilings constructed within a building it should also be appreciated that the suspended ceiling could be fitted externally to a building. For example, the suspended ceiling could be constructed under an outdoor awning.

Advantages

The present invention provides the advantage of a gap between the top cross rail or channel and the rear side of the ceiling panel which allows items to be easily and reliably mounted in the void or in ceiling panel. The hanger clips allow the ceiling panels and the support runners to be mounted a pre-determined distance from the top cross rail. The length of the suspension rod and the hanger clip provide the void which provides the versatility to easily mount recessed lighting or the like components in the ceiling. The hanger clips and the associated length of the suspension rods are able to be easily mounted and the ability to vary the length of the suspension rod allows the user to produce voids of varying dimensions. This is particularly important when mounting components in the ceiling panels or plasterboards and the within the voids which require more clearance than is previously available to the user.

The present invention also provides the ability to easily combine the components of a concealed suspended ceiling with those of an exposed suspended ceiling and still provide the void between the back side of the ceiling panel and the bottom of the top cross rail. The ability to use some of the same components in both systems provides further utility to the invention. In particular, the top cross rail can be extended above and utilised by the hanger clips of the present invention to suspend the support runners or tees and the ceiling panels in an exposed suspended ceiling system or grid.

Given the number of top cross rails, support runners and furring channels required to direct fix the plasterboard and support the ceiling panels, it can be somewhat limiting where items like lighting, speakers and air conditioning ducts and vents can be placed. These items are typically flush mounted onto the outside surface of the plasterboard or ceiling panel and the majority of the size of these items is located within the ceiling cavity or void formed between the backs of the plasterboard and ceiling panels and the grid work of channels forming the suspended ceiling frame. Therefore providing a hanger clip with sufficient clearance within the cavity allows the mounting of most items to the ceiling. Likewise these items are normally mounted using some form of clip retainer which needs to be located on the opposite side of the plasterboard or ceiling panel to where the item is located, so there must also be sufficient clearance for these attachment devices within the grid work of channels of the suspended ceiling system. The present invention provides that clearance and ability to mount such items easily in the suspended ceiling system.

The present invention provides the suspended ceiling contractor with the ability to change easily between the flush mounted plasterboard concealed ceiling and the exposed grid or concealed grid and tile suspended ceiling without having to change the top cross rail or suspension from above.

Variations

It will be realized that the foregoing has been given by way of illustrative example only and that all other modifications and variations as would be apparent to persons skilled in the art are deemed to fall within the broad scope and ambit of the invention as herein set forth.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the scope of the above described invention.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The invention claimed is:

1. A suspended ceiling hanger clip comprising:
a longitudinally extending base having a first end and a second end;
a pair of resiliently deformable generally parallel co-extensive flanges extending downwardly from the base and between which the base is located;
at least one projection in each flange, each projection forming a ramp surface extending transversely outwardly from each respective flange;
an aperture is centrally located on a pad formed in the base and positioned equidistant from the first and second ends of the base;
an elongate suspension rod having a longitudinal axis extending along a length between an upper end and a spaced apart lower end, the lower end having an attachment means; and
wherein the upper end passes through the aperture in the base of the hanger clip and is bent through an angle of approximately 180 degrees with respect to the longitudinal axis of the suspension rod to fixedly retain the upper end from removal from the aperture in the base of the hanger clip, and an outer face of the upper end is in contact with the pad formed in the base.

2. A suspended ceiling hanger clip as claimed in claim 1, wherein the length of the suspension rod is in the range of 50 to 500 mm.

3. A suspended ceiling hanger clip as claimed in claim 2, wherein the length of the suspension rod is varied to achieve a pre-determined distance from the base of the hanger clip to the lower end of the suspension rod in the range of 50 to 500 mm.

4. A suspended ceiling hanger clip as claimed in claim 1, wherein the at least one projection in each flange is pressed outwardly from the flange at a location adjacent the base of the hanger clip.

5. A suspended ceiling hanger clip as claimed in claim 1, wherein the angle which the upper end of the suspension rod is bent is in the range of 150 to 180 degrees with respect to the longitudinal axis of the suspension rod.

6. A suspended ceiling hanger clip as claimed in claim 1, wherein the attachment means at the lower end of the suspension rod comprises any one of:
i) a hook bent at an angle of approximately 30 degrees with respect to a longitudinal axis of the suspension rod; or
ii) a threaded socket located within the lower end of the suspension rod; or
iii) a screw thread located on an outer surface of the lower end of the suspension rod; or
iv) a longitudinally extending straight section of the suspension rod located at or adjacent the lower end of the suspension rod.

7. A suspended ceiling hanger clip as claimed in claim 6, wherein the attachment means comprises the screw thread located on the outer surface of the lower end of the suspension rod and the screw thread is engaged by a threaded socket within a thread adjustable suspension clip.

8. A suspended ceiling hanger clip as claimed in claim 7, wherein the attachment means comprises the longitudinally extending straight section of the suspension rod located at or adjacent the lower end of the suspension rod and the longitudinally extending straight section is engaged by a spring adjustable suspension clip.

9. A suspended ceiling hanger clip as claimed in claim 1, wherein the pair of co-extensive flanges extending downwardly from the base terminate at a lower end portion with a horizontal tab extending outwardly therefrom.

10. A suspended ceiling hanger clip as claimed in claim 9, wherein a surface of the horizontal flange is spaced a distance from the at least one projection in each flange to allow the suspended ceiling clip to be received and secured within a longitudinal channel.

11. A suspended ceiling hanger clip as claimed in claim 10, wherein the surface of the horizontal flange is adapted to make contact with a lower surface of the longitudinal channel.

12. A suspended ceiling hanger clip as claimed in claim 11, wherein the hanger clip is manufactured from a resiliently deformable material, and the resiliently deformable material is any one of a sheet metal made from aluminum or steel or a high density plastics material.

13. A suspended ceiling hanger clip as claimed in claim 1, wherein the suspension rod is rotatable within the aperture in the base and the outer face of the upper end of the suspension rod moves around the pad in the base, the rotation allows the lower end of the suspension rod and the attachment means to be rotatably positioned at any position when suspended from the hanger clip.

14. A suspended ceiling system comprising:
a plurality of top cross rails, each top cross rail having a base extending longitudinally with a pair of generally parallel co-extensive flanges extending downwardly from the base and forming a longitudinal slot bordered by in-turned opposing longitudinal jaws on each flange;
a plurality of adjustable length hanger assemblies anchored to a structural part of a building and connected with each top cross rail and suspending each top cross rails at a selected height in a common plane with other ones of said top cross rails;
a plurality of parallel mounted support runners interconnected to form a grid, each support runner having an upper flange, a lower flange for holding a ceiling panel, and a vertical web interconnecting said flanges and provided with at least one opening, the parallel mounted support runners extending beneath and crossing the top cross rails; and
a plurality of suspended ceiling hanger clips, each suspended ceiling hanger clip comprising:
a longitudinally extending base having a first end and a second end;
a pair of resiliently deformable generally parallel co-extensive flanges extending downwardly from the base and between which the base is located;
at least one projection in each flange, each projection forming a ramp surface extending transversely outwardly from each respective flange and each projection adapted to engage with a surface of the in-turned opposing longitudinal jaws on the top cross rail to engage the hanger clip within the longitudinal slot of the top cross rail;
an aperture is centrally located on a pad formed in the base and positioned equidistant from the first and second ends of the base;
an elongate suspension rod having a longitudinal axis extending along a length between an upper end and spaced apart lower end, the lower end having an attachment means for releasably engaging either the at least one opening in the support runner or the upper flange in the support runner; and wherein the upper end passes through the aperture in the base of the hanger clip and is bent through an angle of approximately 180 degrees with respect to the longitudinal axis of the suspension rod to fixedly retain the upper end from removal from the aperture in the base of the hanger clip, and an outer face of the upper end is in contact with the pad formed in the base; and wherein the upper end of the suspension rod extends through and is fixedly retained from removal from the aperture in the base of the hanger clip;

wherein the length which the suspension rod extends from the base of the hanger clip spaces apart the top cross rail and the support runner when the hanger clip is secured within the longitudinal slot of the top cross rail and connected to the support runner, thereby providing a first void therebetween, wherein the first void formed between the top cross rail and the support runner is sized to allow clearance for mounting of components in a second void formed between i) a backside of the ceiling panel held within the support runner and ii) a bottom of the top cross rail.

15. A suspended ceiling as claimed in claim 14, wherein by resiliently deforming the flanges of the hanger clip allows the projections and ramp sections to snap fit within the in-turned opposing longitudinal jaws extending from the top cross rail and to inhibit the removal of the hanger clip from the top cross rail, and allows the hanger clip to be free to slide within the top cross rail when the flanges are resiliently deformed, therefore making the hanger clip adjustable within the top cross rail.

16. A suspended ceiling as claimed in claim 14, wherein the length of the suspension rod is in the range of 50 to 500 mm.

17. A suspended ceiling as claimed in claim 16, wherein the length of the suspension rod varies a distance which spaces apart the top cross rail and the support runner, thereby varying a size of the first void and second voids.

18. A suspended ceiling as claimed in claim 14, wherein the hanger assemblies further comprise a pair of hooks for accommodating and securing a top section of the top cross rail and an adjustable anchorage for suspending at a selected level the top cross rail from the structural part of the building located above the suspended ceiling, the adjustable anchorage comprises a pair of extendible rods frictionally joined together at adjacent ends by an apertured bowed leaf spring.

19. A ceiling construction for suspension within a room of a building or an external ceiling, comprising when assembled:
a plurality of parallel spaced top cross rails;
a plurality of adjustable length hanger assemblies anchored to structural parts within the room of the building or an external ceiling and connected with each top cross rail and suspending each top cross rail at a selected height in a common plane with other ones of said top cross rails;
a combination of a plurality of parallel mounted support runners interconnected to form a grid for holding a ceiling panel and a plurality of parallel mounted furring channels to which a flush mounted builders ceiling board is fixed, the parallel mounted support runners and the parallel mounted furring channels extending beneath and crossing the top cross rails;
a plurality of hanger clips for joining the top cross rails to the parallel mounted support runners, each suspended ceiling hanger clip comprising:
a longitudinally extending base having a first end and a second end;
a pair of generally parallel co-extensive flanges extending downwardly from the base and between which the base is located;
at least one projection in each flange, each projection forming a ramp surface extending transversely outwardly from each respective flange and each projection adapted to engage with a surface of an in-turned opposing longitudinal jaws on the top cross rail to engage the hanger clip within a longitudinal slot of the top cross rail;
an aperture is centrally located on a pad formed in the base and positioned equidistant from the first and second ends of the base;
an elongate suspension rod having a longitudinal axis extending along a length between an upper end and spaced apart lower end, the lower end having an attachment means for releasably engaging either the at least one opening in the support runner or the upper flange in the support runner; and
wherein the upper end passes through the aperture in the base of the hanger clip and is bent through an angle of approximately 180 degrees with respect to the longitudinal axis of the suspension rod to fixedly retain the upper end from removal from the aperture in the base of the hanger clip, and an outer face of the upper end is in contact with the pad formed in the base;
a plurality of key clips for joining the top cross rails to the parallel mounted furring channels, the clip comprising:
a longitudinally extending base;
a pair of flanges extending downwardly a length from the base and between which the base is located;
a pair of hooks on each flange, each pair of hooks adapted to releasably connect to the furring channel;
at least one projection in each flange, each projection engaging with a surface on the top cross rail to secure the key clip within the longitudinal slot of the top cross rail; and
wherein the lengths of the suspension rods of the suspended ceiling hanger clips and the pair of flanges of the key clips space apart the top cross rails from the respective support runners and furring channels when the hanger clips and the key clips are secured within the longitudinal slot of the top cross rails and connected to the support runner and the furring channel respectively, thereby providing a first void therebetween, wherein the first void formed between the top cross rails and the support runners and the furring channels is sized to allow clearance for mounting of components in a second void formed between i) a backside of the ceiling panel held within the support runner and a backside of the flush mounted builders ceiling board fixed to the furring channels and ii) a bottom of the top cross rail.

\* \* \* \* \*